United States Patent
Cohen et al.

(10) Patent No.: US 11,914,117 B2
(45) Date of Patent: Feb. 27, 2024

(54) FOLDED MACRO-TELE CAMERA LENS DESIGNS INCLUDING SIX LENSES OF ++−+−+ OR +−++−+, SEVEN LENSES OF ++−++−+, OR EIGHT LENSES OF ++−++−++ REFRACTIVE POWERS

(71) Applicant: Corephotonics Ltd., Tel-Aviv (IL)

(72) Inventors: Noy Cohen, Tel Aviv (IL); Roy Rudnick, Tel Aviv (IL); Michael Dror, Nes Ziona (IL); Nadav Goulinski, Petah Tikva (IL); Ephraim Goldenberg, Ashdod (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/614,380

(22) PCT Filed: Jul. 14, 2021

(86) PCT No.: PCT/IB2021/056358
§ 371 (c)(1),
(2) Date: Nov. 26, 2021

(87) PCT Pub. No.: WO2022/023855
PCT Pub. Date: Feb. 3, 2022

(65) Prior Publication Data
US 2023/0148183 A1    May 11, 2023

Related U.S. Application Data

(60) Provisional application No. 63/070,501, filed on Aug. 26, 2020, provisional application No. 63/059,200, filed on Jul. 31, 2020.

(51) Int. Cl.
*G02B 13/00*    (2006.01)

(52) U.S. Cl.
CPC ..... *G02B 13/0065* (2013.01); *G02B 13/0045* (2013.01)

(58) Field of Classification Search
CPC .................. G02B 13/0065; G02B 13/0045
See application file for complete search history.

(56) References Cited

U.S. PATENT DOCUMENTS 2,106,752 A    2/1938    Land
2,354,503 A    7/1944    Arthur
(Continued)

FOREIGN PATENT DOCUMENTS

CN    102193162 A    9/2011
CN    102147519 B    1/2013
(Continued)

OTHER PUBLICATIONS

KR-20180119885-A, translation (2018).*
(Continued)

*Primary Examiner* — Wen Huang
(74) *Attorney, Agent, or Firm* — Nathan & Associates Menachem Nathan

(57) ABSTRACT

Folded digital cameras comprising a lens system with a lens and an image sensor, the lens having $N \geq 6$ lens elements $L_i$, an effective focal length (EFL) and a total track length (TTL), wherein each lens element has a respective focal length $f_i$ and wherein a first lens element $L_1$ faces an object side, and an optical path folding element (OPFE) for providing a folded optical path between an object and the lens. In some embodiments, the lens system has a focusing range that covers object-lens distances from infinity to a minimal object distance (MIOD), wherein MIOD/EFL is smaller than 20 or even 7. In some embodiments, the ratio of a maximal (Continued)

chief ray angle to a field of view of the folded camera Max CRA/FOV is smaller than 0.25 or even 0.15 when the camera is focused at infinity.

25 Claims, 12 Drawing Sheets

(56) References Cited

U.S. PATENT DOCUMENTS

| | | | |
|---|---|---|---|
| 2,378,170 A | 6/1945 | Aklin | |
| 2,441,093 A | 5/1948 | Aklin | |
| 3,388,956 A | 6/1968 | Eggert et al. | |
| 3,524,700 A | 8/1970 | Eggert et al. | |
| 3,558,218 A | 1/1971 | Grey | |
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 5,000,551 A | 3/1991 | Shibayama | |
| 5,327,291 A | 7/1994 | Baker et al. | |
| 5,969,869 A | 10/1999 | Hirai et al. | |
| 6,014,266 A | 1/2000 | Obama et al. | |
| 6,147,702 A | 11/2000 | Smith | |
| 6,169,636 B1 | 1/2001 | Kreitzer | |
| 6,654,180 B2 | 11/2003 | Ori | |
| 7,187,504 B2 | 3/2007 | Horiuchi | |
| 7,206,136 B2 | 4/2007 | Labaziewicz et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Iyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Souma | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,958,164 B2 | 2/2015 | Kwon et al. | |
| 9,185,291 B1 | 11/2015 | Shabtay et al. | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 2002/0118471 A1 | 8/2002 | Imoto | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2006/0238902 A1 | 10/2006 | Nakashima et al. | |
| 2007/0229983 A1 | 10/2007 | Saori | |
| 2008/0056698 A1 | 3/2008 | Lee et al. | |
| 2008/0094730 A1 | 4/2008 | Toma et al. | |
| 2008/0304161 A1 | 12/2008 | Souma | |
| 2009/0002839 A1 | 1/2009 | Sato | |
| 2009/0067063 A1 | 3/2009 | Asami et al. | |
| 2009/0122423 A1 | 5/2009 | Park et al. | |
| 2009/0141365 A1 | 6/2009 | Jannard et al. | |
| 2009/0147368 A1 | 6/2009 | Oh et al. | |
| 2009/0225438 A1 | 9/2009 | Kubota | |
| 2010/0165476 A1 | 7/2010 | Eguchi | |
| 2010/0277813 A1 | 11/2010 | Ito | |
| 2011/0001838 A1 | 1/2011 | Lee | |
| 2011/0115965 A1 | 5/2011 | Engelhardt et al. | |
| 2011/0149119 A1 | 6/2011 | Matsui | |
| 2011/0157430 A1 | 6/2011 | Hosoya et al. | |
| 2011/0188121 A1 | 8/2011 | Goring et al. | |
| 2011/0249347 A1 | 10/2011 | Kubota | |
| 2012/0069455 A1 | 3/2012 | Lin et al. | |
| 2012/0092777 A1 | 4/2012 | Tochigi et al. | |
| 2012/0105708 A1 | 5/2012 | Hagiwara | |
| 2012/0154929 A1 | 6/2012 | Tsai et al. | |
| 2012/0229920 A1 | 9/2012 | Otsu et al. | |
| 2012/0262806 A1 | 10/2012 | Lin et al. | |
| 2013/0057971 A1 | 3/2013 | Zhao et al. | |
| 2013/0088788 A1 | 4/2013 | You | |
| 2013/0208178 A1 | 8/2013 | Park | |
| 2013/0279032 A1 | 10/2013 | Suigetsu et al. | |
| 2013/0286488 A1 | 10/2013 | Chae | |
| 2014/0022436 A1 | 1/2014 | Kim et al. | |
| 2014/0092487 A1 | 4/2014 | Chen et al. | |
| 2014/0146216 A1 | 5/2014 | Okumura | |
| 2014/0204480 A1 | 7/2014 | Jo et al. | |
| 2014/0285907 A1 | 9/2014 | Tang et al. | |
| 2014/0293453 A1 | 10/2014 | Ogino et al. | |
| 2014/0362274 A1 | 12/2014 | Christie et al. | |
| 2015/0116569 A1 | 4/2015 | Mercado | |
| 2015/0244942 A1 | 8/2015 | Shabtay et al. | |
| 2015/0253532 A1 | 9/2015 | Lin | |
| 2015/0253543 A1 | 9/2015 | Mercado | |
| 2015/0253647 A1 | 9/2015 | Mercado | |
| 2015/0373252 A1 | 12/2015 | Georgiev | |
| 2015/0373263 A1 | 12/2015 | Georgiev et al. | |
| 2016/0044250 A1 | 2/2016 | Shabtay et al. | |
| 2016/0062084 A1 | 3/2016 | Chen et al. | |
| 2016/0070088 A1 | 3/2016 | Koguchi | |
| 2016/0085089 A1 | 3/2016 | Mercado | |
| 2016/0187631 A1 | 6/2016 | Choi et al. | |
| 2016/0291295 A1 | 10/2016 | Shabtay et al. | |
| 2016/0306161 A1 | 10/2016 | Harada et al. | |
| 2016/0313537 A1 | 10/2016 | Mercado | |
| 2016/0341931 A1 | 11/2016 | Liu et al. | |
| 2016/0353008 A1 | 12/2016 | Osborne | |
| 2017/0102522 A1 | 4/2017 | Jo | |
| 2017/0115471 A1 | 4/2017 | Shinohara | |
| 2017/0160511 A1 | 6/2017 | Kim et al. | |
| 2017/0199360 A1 | 7/2017 | Chang | |
| 2018/0059365 A1 | 3/2018 | Bone et al. | |
| 2018/0217475 A1 | 8/2018 | Goldenberg et al. | |
| 2018/0224630 A1 | 8/2018 | Lee et al. | |
| 2019/0086638 A1* | 3/2019 | Lee | H04N 23/687 |
| 2019/0170965 A1 | 6/2019 | Shabtay et al. | |
| 2019/0235202 A1 | 8/2019 | Smyth et al. | |
| 2020/0192069 A1 | 6/2020 | Makeev et al. | |

(56) References Cited

U.S. PATENT DOCUMENTS

| 2020/0221026 A1 | 7/2020 | Fridman et al. |
| 2021/0364746 A1 | 11/2021 | Chen |
| 2021/0396974 A1 | 12/2021 | Kuo |

FOREIGN PATENT DOCUMENTS

| CN | 104297906 A | | 1/2015 |
| CN | 105467563 A | | 4/2016 |
| JP | S54157620 A | | 12/1979 |
| JP | S59121015 A | | 7/1984 |
| JP | 6165212 A | | 4/1986 |
| JP | S6370211 A | | 3/1988 |
| JP | 406059195 A | | 3/1994 |
| JP | H11223771 A | | 8/1999 |
| JP | 2004334185 A | | 11/2004 |
| JP | 2006195139 A | | 7/2006 |
| JP | 2007133096 A | | 5/2007 |
| JP | 2007219199 A | | 8/2007 |
| JP | 2007306282 A | | 11/2007 |
| JP | 2008191423 A | | 8/2008 |
| JP | 2010164841 A | | 7/2010 |
| JP | 2012203234 A | | 10/2012 |
| JP | 2013105049 A | | 5/2013 |
| JP | 2013106289 A | | 5/2013 |
| JP | 2014142542 A | | 8/2014 |
| KR | 20090131805 A | | 12/2009 |
| KR | 20140135909 A | | 5/2013 |
| KR | 20140023552 A | | 2/2014 |
| KR | 20180119885 A | * | 11/2018 |
| TW | M602642 U | | 10/2020 |
| WO | 2013058111 A1 | | 4/2013 |
| WO | 2013063097 A1 | | 5/2013 |
| WO | 2018130898 A1 | | 7/2018 |

OTHER PUBLICATIONS

European Search Report in related EP patent application 21850021.3, dated Nov. 22, 2022.
Office Action in related EP patent application 21850021.3, dated Dec. 16, 2022.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Office Action in related TW patent application No. 110127428, dated May 11, 2022.
Office Action in related KR patent application 2021-7035144, dated May 1, 2023.

* cited by examiner

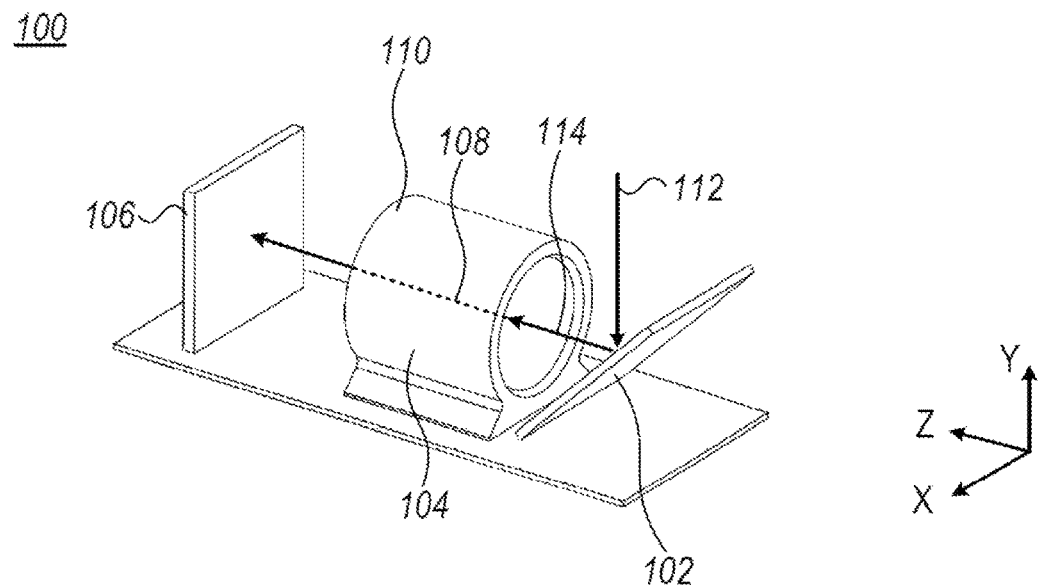
FIG. 1A KNOWN ART
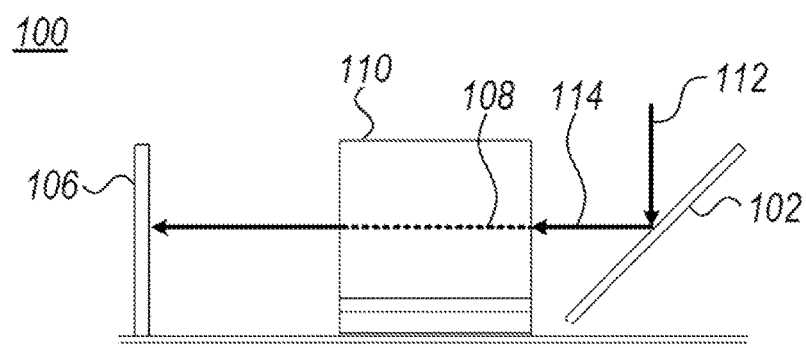
FIG. 1B KNOWN ART

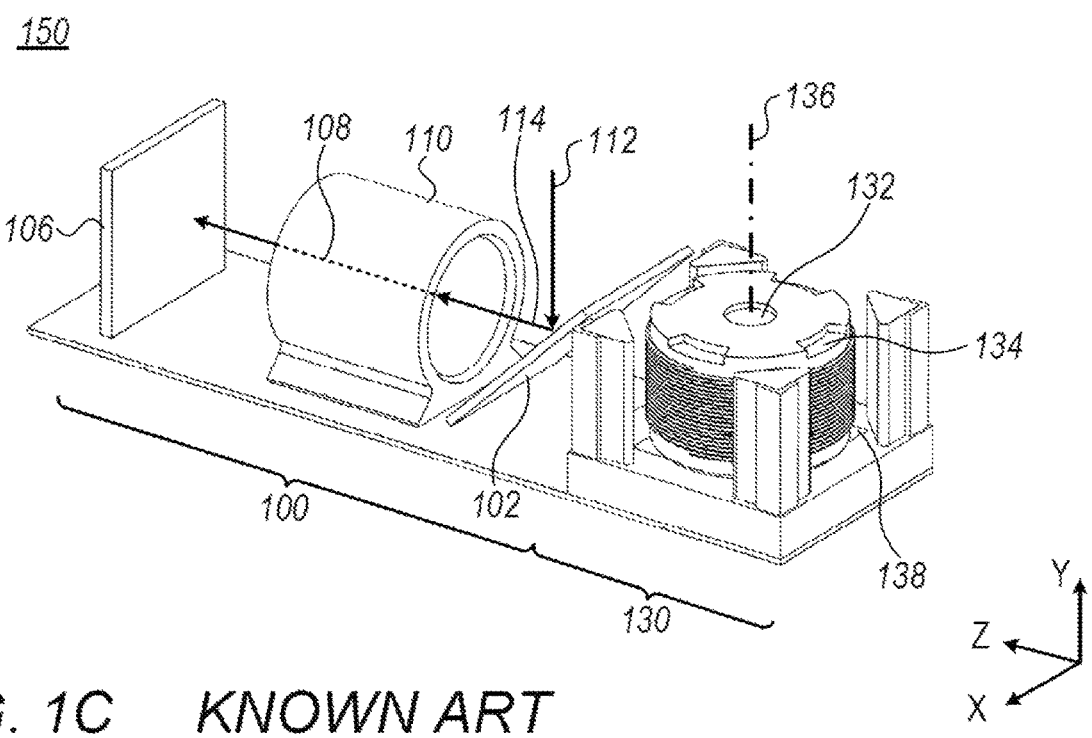
FIG. 1C   KNOWN ART

FOLDED MACRO-TELE CAMERA LENS DESIGNS INCLUDING SIX LENSES OF +++−+ OR +−++−+, SEVEN LENSES OF ++−++−+, OR EIGHT LENSES OF ++−++−++ REFRACTIVE POWERS

CROSS REFERENCE TO EXISTING APPLICATIONS

This is a 371 of international patent application PCT/IB2021/056358, which claims priority from U.S. Provisional Patent Applications Nos. 63/059,200 filed Jul. 31, 2020, and 63/070,501 filed Aug. 26, 2020, which are incorporated herein by reference in their entirety.

FIELD

The presently disclosed subject matter is related in general to the field of digital cameras and in particular to folded lenses in such cameras.

DEFINITIONS

In this application and for optical and other properties mentioned throughout the description and figures, the following symbols and abbreviations are used, all for terms known in the art:

Total track length (TTL): the maximal distance, measured along an axis parallel to the optical axis of a lens, between a point of the front surface $S_1$ of a first lens element $L_1$ and an image sensor, when the system is focused to an infinity object distance.

Back focal length (BFL): the minimal distance, measured along an axis parallel to the optical axis of a lens, between a point of the rear surface $S_{2N}$ of a last lens element $L_N$ and an image sensor, when the system is focused to an infinity object distance.

Effective focal length (EFL): in a lens (assembly of lens elements $L_1$ to $L_N$), the distance between a rear principal point P' and a rear focal point F' of the lens.

f-number, (f/#): the ratio of the EFL to an entrance pupil diameter.

Chief ray angle (CRA): a (image-side) chief ray is the line between the center of the exit pupil of a lens system and an image point. The CRA is the angle between a chief ray and the optical axis of the lens. Here and in the following, we refer to image-side chief rays and CRAs, in contrast to an object-side chief ray, which is the line between an object point and the center of the entrance pupil of a lens system. A maximal CRA (Max CRA) is the largest CRA present in a lens system considering all fields supported by the lens system.

BACKGROUND

Multi-aperture cameras (or "multi-cameras", of which a "dual-cameras" having two cameras is an example) are becoming the standard choice of portable electronic mobile device (e.g. smartphones, tablets, etc.) makers. A multi-camera setup usually comprises a wide field-of-view (or "angle") $FOV_W$ camera ("Wide" camera or "W" camera), and at least one additional camera, either with the same FOV (e.g. a depth auxiliary camera), with a narrower (than $FOV_W$) FOV (Telephoto or "Tele" camera with $FOV_T$), or with an ultra-wide field of view $FOV_{UW}$ (wider than $FOV_W$, "UW" camera).

FIGS. 1A and 1B illustrate a known digital folded camera 100. Camera 100 comprises an optical path folding element (OPFE) 102 e.g. a prism or mirror, a lens 104 with a plurality of lens elements (not visible in this representation, but visible e.g. in FIGS. 2A-D) and an image sensor 106. The lens elements may be (as in FIGS. 2A-2D) axial symmetric along an optical axis 108. In other embodiments, the lens elements may not be axial symmetric. For example, lens elements may be cut (diced, sliced) into a non-circular shape (not shown).

At least some of the lens elements may be included in a "barrel" 110. The barrel may have a longitudinal symmetry along optical axis 108. In FIGS. 1A to 1C, the cross-section of this barrel is circular. This is however not mandatory and other shapes can be used, e.g. for hosting cut lens elements.

The path of the optical rays from an object (not shown) to image sensor 106 defines an optical path (see optical paths 112 and 114, which represent portions of the optical path). OPFE folds the optical path from a first optical path 112 to a second optical path 114, the latter being substantially parallel to optical axis 108

In particular, in some examples, OPFE 102 is inclined at substantially 45 degrees with respect to optical axis 108. In FIG. 1A, OPFE 102 is also inclined at substantially 45 degrees with respect to optical path 112.

In some known examples, image sensor 106 lies in a X-Y plane substantially perpendicular to optical axis 108. This is however not limiting, and image sensor 106 can have a different orientation. For example, and as described in international published patent application WO2016/024192, image sensor 106 may lie in the XZ plane. In this case, an additional OPFE can be used to reflect the optical rays towards image sensor 106.

Two cameras, for example a Wide camera 100 and a regular UW camera 130 may be included in a digital camera 150 (also referred to as dual-camera). A possible configuration is shown in FIG. 1C. UW camera 130 may include an aperture 132 (indicating the object side of the camera) and an optical lens system 134 (or "Wide lens module") with a symmetry (and optical) axis 136 in the Y direction, as well as a UW image sensor 138. The UW camera comprises a UW lens system configured to provide a UW image. As already indicated, the UW camera has a field of view $FOV_{UW}$ larger than $FOV_W$. For example, $FOV_{UW}$ may be 80-130 degrees and $FOV_W$ may be 60-90 deg. Notably, in other examples, a plurality of Wide cameras and/or a plurality of Tele cameras can be incorporated and operative in a single digital camera. The $FOV_T$ of a Tele camera may be for example 20-50 degrees.

A "Macro-photography" mode is becoming a popular differentiator for smartphone cameras. "Macro-photography" refers to photographing objects close to the camera, so that an image recorded on the image sensor is nearly as large as the actual object photographed. The ratio of image size to object size is the object-to-image magnification M, defined by:

$$M = -\frac{v}{u} = -\frac{dist(2nd \text{ principal plane, Image})}{dist(\text{Object}, 1st \text{ principal plane})}$$

where v is a lens-image distance defined by the distance of the $2^{nd}$ (or "rear") principal plane of the lens and the image, and u is an object-lens distance defined by the distance of the object to the $1^{st}$ (or "front") principal plane of the lens. The minus sign is generally not mentioned explicitly.

In the context of digital single-lens reflex (DSLR) cameras, a Macro image is defined by having a M of about 1:1 or larger, e.g. 1:1.1. In the context of smartphones, "Macro image". may refer to images with M of about 10:1 or even 15:1. First smartphone models have entered the consumer market that provide Macro-photography capabilities, usually by enabling very close focusing with a UW camera, which has a relatively short EFL (e.g. 2.5 mm).

A UW camera can focus to the close range required for Macro photography (e.g., 1.5 cm to 15 cm), but its spatial resolution is poor since its focal length is small and its FOV is large. For example, consider a UW camera with 2.5 mm focal length. When focused to an object at 5 cm (lens-object distance), the UW camera will have approximately M=19:1. This according to thin lens equation $$\frac{1}{EFL} = \frac{1}{u} + \frac{1}{v}$$

with EFL=2.5 mm, v=2.6 mm and u=50 mm. Even when focused to as close as 1.5 cm, the M of the UW camera will be approximately 5:1. Capturing objects in Macro images from these short object-lens distances of e.g. u=5 cm or less is very challenging for a user. For example, it may render framing of the image very difficult, it may prohibit taking images of popular Macro objects such as living subjects (e.g. insects), and it may introduce shadows and obscure the lighting in the scene. Additionally, an UW camera has a relatively large depth of field (DoF), even for Macro images. The relatively large DoF corresponds to a low degree of optical Bokeh, which is a highly popular effect in Macro photography.

It would be beneficial to have a Macro camera in mobile devices that captures Macro images from a larger lens-object distance (e.g. 5-15 cm) with larger object to image magnification (e.g. 1:1-15:1), and which has a high degree of optical Bokeh.

SUMMARY

In various embodiments, there are provided folded digital cameras, comprising: a lens system with a lens with N≥6 lens elements $L_i$ and having an EFL and a TTL, wherein each lens element has a respective focal length $f_i$ and wherein a first lens element $L_1$ faces an object side; an image sensor; and an OPFE for providing a folded optical path between an object and the lens, wherein the lens system has a focusing range that covers object-lens distances from infinity to a minimal object distance (MIOD), and wherein MIOD/EFL<20.

In various embodiments, there are provided folded digital cameras, comprising: a lens system with a lens with N≥6 lens elements $L_i$, having an EFL and a TTL, wherein each lens element $L_i$ has a respective focal length $f_i$ and wherein a first lens element $L_1$ faces an object side; an image sensor; and an OPFE for providing a folded optical path between an object and the lens, and wherein Max CRA/FOV<0.25 when the camera is focused at infinity.

In some embodiments, MIOD/EFL may be smaller than 15, 13, 10, or even than 7.

In some embodiments, the maximum field curvature MFC for any object within the focus range may be smaller than 50 μm.

In some embodiments, a camera may have a f number smaller than 4, 3, or even smaller than 2.5

In some embodiments, the lens elements may be divided into two lens element groups separated by a big gap greater than TTL/8, TTL/7, or even greater than TTL/6.

In some embodiments, the lens elements may be divided into a first lens element group with an effective focal length EFL1 and a second lens element group with an effective focal length EFL2, wherein a ratio EFL1/EFL2 may not deviate from 1 by more than 20%, or even by more than 10%

In some embodiments, a camera may further comprise a focusing mechanism for focusing the camera based on a voice coil motor.

In some embodiments, the first lens element L1 and a second lens element L2 may be made of a material with an Abbe number greater than 50.

In some embodiments, TTL/EFL may be smaller than 1.5, 1.4, or even smaller than 1.3.

In some embodiments, a ratio of the focal length $f_N$ of the last lens element $L_N$ and the TTL, $f_N$/TTL may be smaller than 1.0, 0.9, 0.8, 0.75, or even smaller than 0.7.

In some embodiments, Max CRA/FOV may be smaller than 0.2, or even smaller than 0.15.

In some embodiments, a maximum field curvature MFC for any object within the focus range may be smaller than 50 μm.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

FIG. 1A illustrates schematically a known digital folded camera in a perspective view;

FIG. 1B illustrates schematically the camera of FIG. 1A in a side view;

FIG. 1C shows schematically a known dual-camera including a digital camera and an upright camera in a perspective view;

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

FIGS. 2A-2J illustrate various lens systems disclosed herein. All lens systems shown in FIG. 2A-J can be included in a folded camera such as shown in FIGS. 1A and 1B.

Figure 2A:
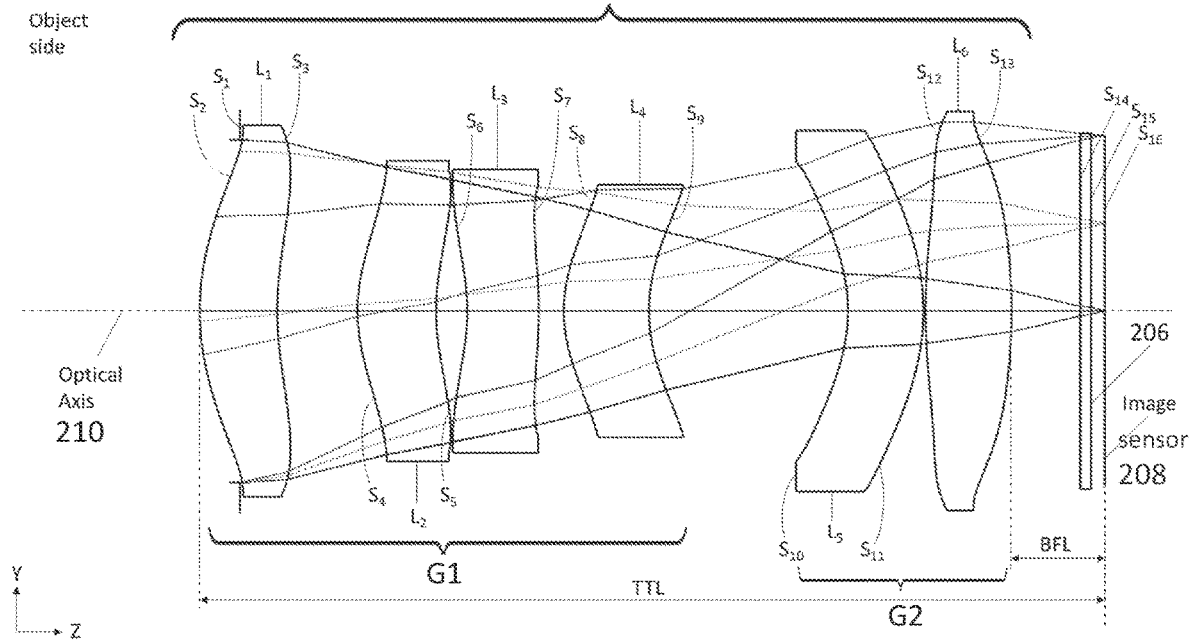
FIG. 2A shows schematically an optical lens system disclosed herein.

FIG. 2A shows schematically an optical lens system disclosed herein and numbered 200. Lens system 200 comprises a lens 204, an optical element 206 and an image sensor 208. System 200 is shown with ray tracing. Optical element 206 may be for example an infra-red (IR) filter, and/or a glass image sensor dust cover. Optical rays (after their reflection by prism 202) pass through lens 204 and form an image on image sensor 208. FIG. 2A shows 3 fields with 3 rays for each: the upper marginal-ray, the lower marginal-ray and the chief-ray. In the example of FIG. 2A, the optical rays pass through optical element 206 before impinging on image sensor 208. This is however not limiting, and in some examples, optical element 206 is not present. That is, the optical element may be optional in some designs.

Lens 204 includes a plurality of N lens elements $L_i$ where "i" is an integer between 1 and N. In lens system 200, N is equal to six. This is however not limiting and a different number of lens elements can be used. According to some examples, N is equal to or greater than 5. For example, N can be equal to 5, 6, 7, 8, 9 or 10. $L_1$ is the lens element closest to the object (prism) side and $L_N$ is the lens element closest to the image side, i.e. the side where the image sensor is located. This order holds for all lenses and lens elements disclosed herein. Lens elements $L_i$ can be used e.g. as lens elements of a camera similar to camera 100. The N lens elements are axial symmetric along an optical (lens) axis 210. Each lens element $L_i$ comprises a respective front surface $S_{2i-1}$ (the index "2i-1" being the number of the front surface) and a respective rear surface $S_{2i}$ (the index "2i" being the number of the rear surface). This numbering convention is used throughout the description. Alternatively, as done throughout this description, lens surfaces are marked as "$S_k$", with k running from 1 to 2N. The front surface and the rear surface can be in some cases aspherical. This is however not limiting.

As used herein, the term "front surface" of each lens element refers to the surface of a lens element located closer to the entrance of the camera (camera object side), and the term "rear surface" refers to the surface of a lens element located closer to the image sensor (camera image side).

As explained below, a clear height value $CH(S_k)$ and a clear aperture value $CA(S_k)$ can be defined for each surface $S_k$ (for $1 \le k \le 2N$. $CA(S_k)$ and $CH(S_k)$ define optical properties of each surface $S_k$ of each lens element. The CH term is defined with reference to FIG. 4 and the CA term is defined with reference to FIG. 5.

Figure 6:
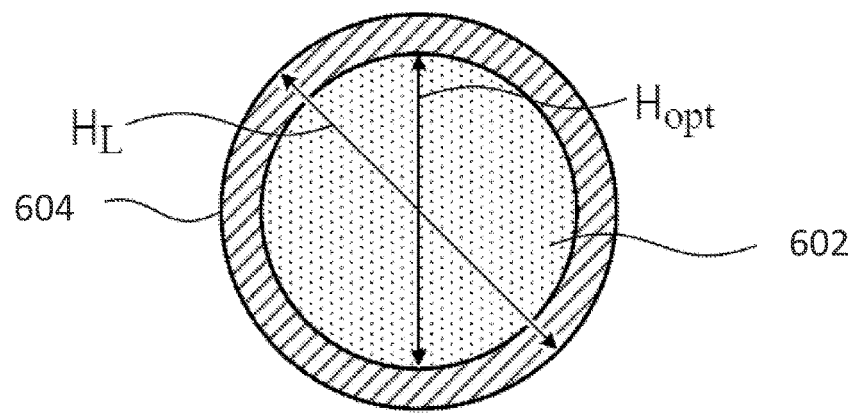
FIG. 6 provides a graphical illustration of diameter $H_{Li}$ of lens element $L_i$.

In addition a height $H_{Li}$ (for $1 \le i \le N$) is defined for each lens element $L_i$. $H_{Li}$ corresponds, for each lens element $L_i$, to the maximal height of lens element $L_i$ measured along an axis perpendicular to the optical axis of the lens elements. For a given lens element, the respective $H_{Li}$ is greater than, or equal to the CH and the CA of the front and rear surfaces of this given lens element. Typically, for an axial symmetric lens element, $H_{Li}$ is the diameter of lens element $L_i$ as seen in FIG. 6. Typically, for an axial symmetric lens element, $H_{Li} = \max\{CA(S_{2i-1}), CA(S_{2i})\}$+a mechanical part size. In general, in lens design the mechanical part size is defined as not contributing to the optical properties of the lens. Consequently, one defines two heights of a lens element $L_i$, an optical height $H_{opt,i}$ (corresponding to the CA value) of an optically active area 602 and a geometrical height of the lens $H_{Li}$ of an entire lens area 604 which covers an optically active and an optically inactive area. The mechanical part and its properties are defined below. The mechanical part size contribution to $H_{Li}$ is typically 200-1000 μm.

In lens system 200, some of the surfaces of the lens elements are represented as convex, and some are represented as concave. The representation of FIG. 2A is however not limiting, and a different combination of convex and/or concave surfaces can be used, depending on various factors such as the application, the desired optical power, etc.

Figure 3A:
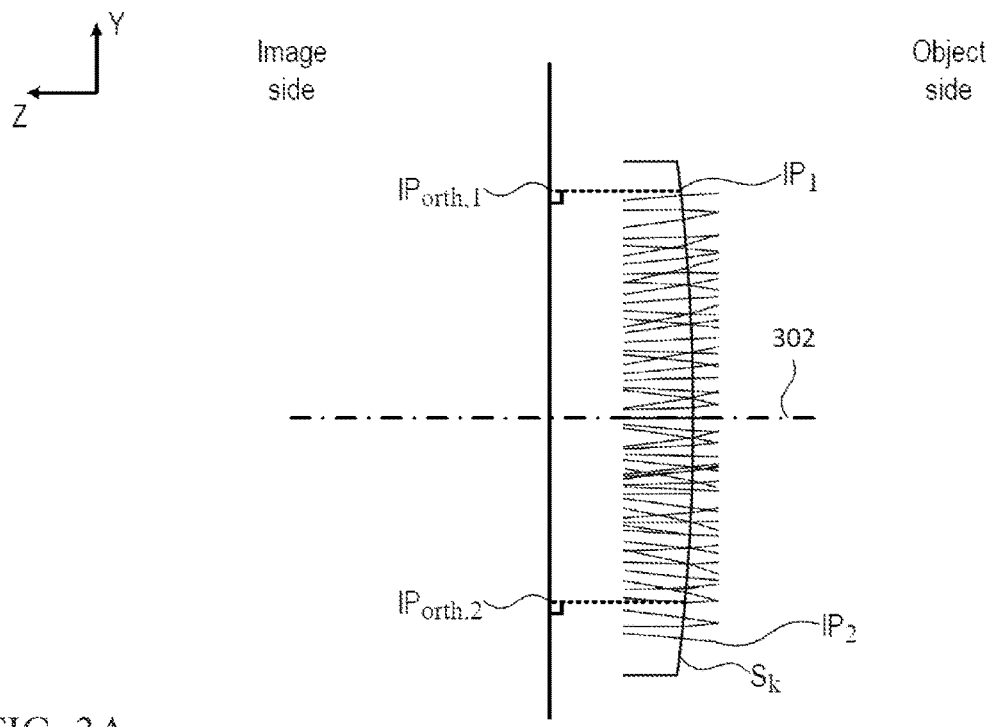
FIG. 3A illustrates the orthogonal projections $IP_{orth,1}$, $IP_{orth,2}$ of two impact points $IP_1$ and $IP_2$ on a plane P that is orthogonal to the optical axis of the lens of the system in FIGS. 2A-2D.
Figure 3B:
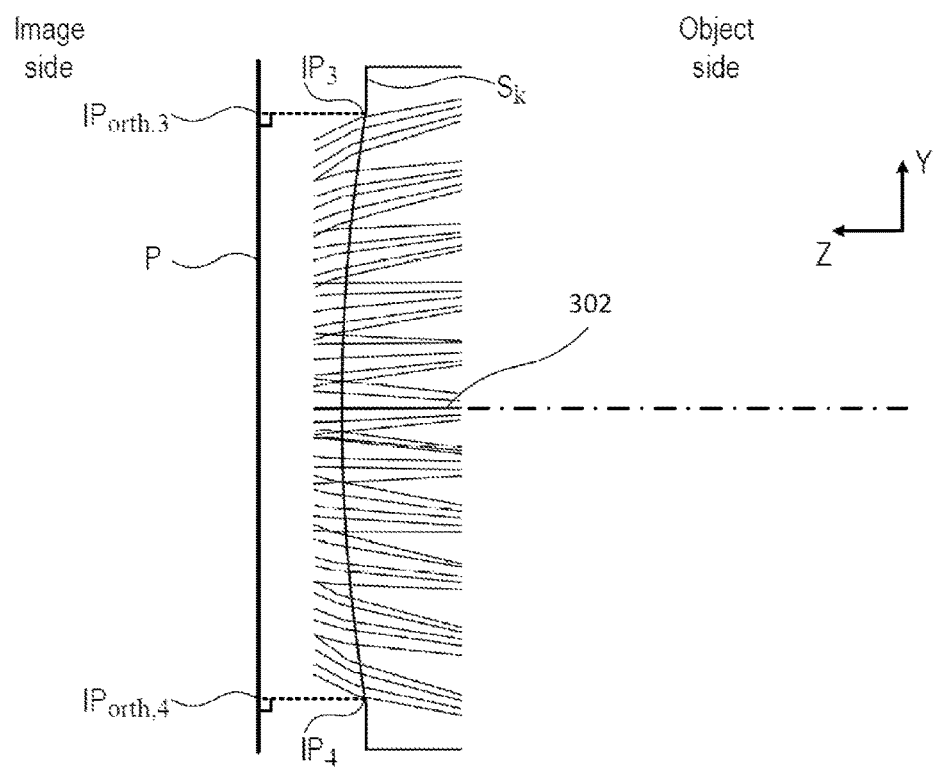
FIG. 3B illustrates the orthogonal projections $IP_{orth,3}$, $IP_{orth,4}$ of two impact points $IP_3$ and $IP_4$ on a plane P that is orthogonal to the optical axis of the lens of the system in FIGS. 2A-2D.
Figure 4:
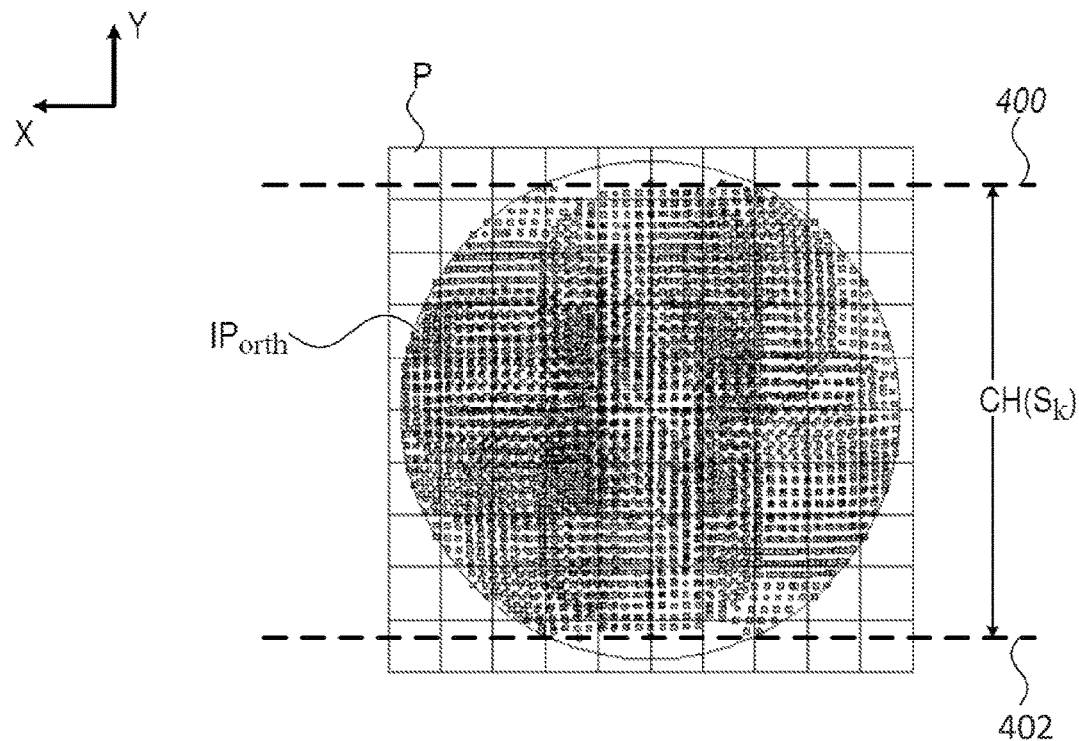
FIG. 4 provides graphically a definition of clear height.

As shown in FIGS. 3A, 3B and 4, each optical ray that passes through a surface $S_k$ impinges this surface on an impact point IP. Optical rays enter optical lens system 200 from surface $S_1$ and pass through surfaces $S_2$ to $S_{2N}$. Some optical rays can impinge on any surface $S_k$ but cannot/will not reach image sensor 208. For a given surface $S_k$, only optical rays that can form an image on image sensor 208 are considered. $CH(S_k)$ is defined as the distance between two closest possible parallel lines, see lines 400 and 402 in FIG. 4 located on a plane P orthogonal to the optical axis of the lens elements. In the representation of FIGS. 3A and 3B, plane P is parallel to plane X-Y and is orthogonal to optical axis 302 such that the orthogonal projection $IP_{orth}$ of all impact points IP on plane P is located between the two parallel lines.

The definition of $CH(S_k)$ does not depend on the object currently imaged, since it refers to the optical rays that "can" form an image on the image sensor. Thus, even if the currently imaged object is located in a black background that does not produce light, the definition does not refer to this black background since it refers to any optical rays that "can" reach the image sensor to form an image (for example optical rays emitted by a background which would emit light, contrary to a black background).

For example, FIG. 3A illustrates the orthogonal projections $IP_{orth,1}$, $IP_{orth,2}$ of two impact points $IP_1$ and $IP_2$ on plane P which is orthogonal to optical axis 302. By way of example, in the representation of FIG. 3A, surface $S_k$ is convex.

FIG. 3B illustrates the orthogonal projections $IP_{orth,3}$, $IP_{orth,4}$ of two impact points $IP_3$ and $IP_4$ on plane P. By way of example, in the representation of FIG. 3B, surface $S_k$ is concave.

In FIG. 4, the orthogonal projection $IP_{orth}$ of all impact points IP of a surface $S_k$ on plane P is located between parallel lines 400 and 402. $CH(S_k)$ is thus the distance between lines 400 and 402.

Figure 5:
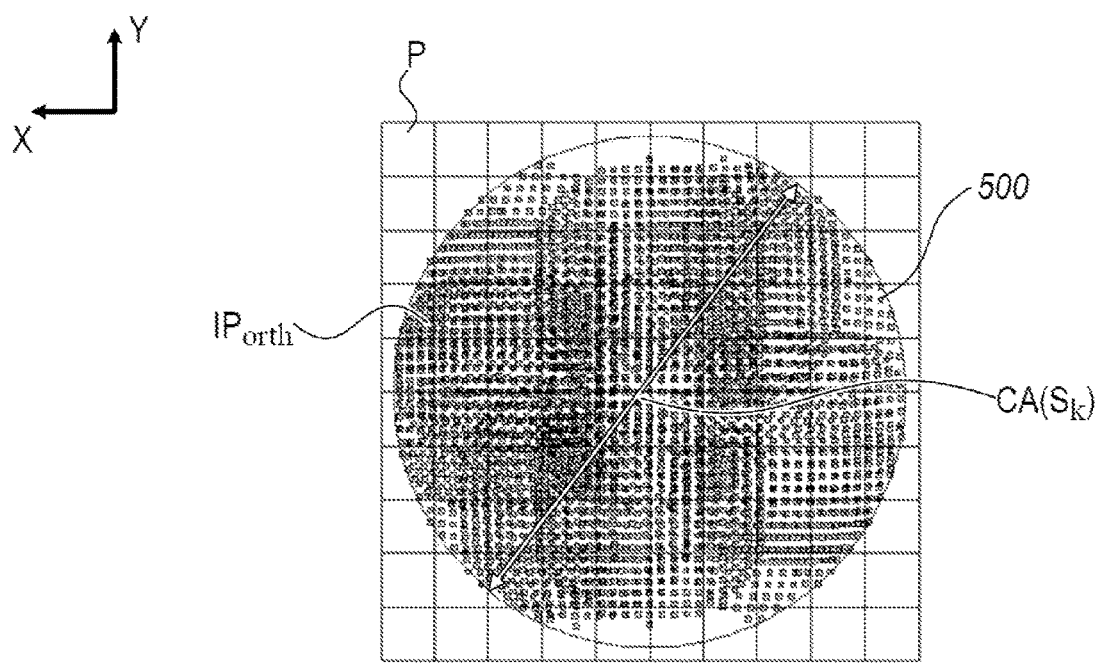
FIG. 5 provides graphically a definition of clear aperture.

Attention is drawn to FIG. 5. According to the presently disclosed subject matter, a clear aperture $CA(S_k)$ is defined for each given surface $S_k$ (for $1 \leq k \leq 2N$), as the diameter of a circle, wherein the circle is the smallest possible circle located in a plane P orthogonal to the optical axis 108 and encircling all orthogonal projections $IP_{orth}$ of all impact points on plane P. As mentioned above with respect to $CH(S_k)$, the definition of $CA(S_k)$ also does not depend on the object which is currently imaged. As shown in FIG. 5, the circumscribed orthogonal projection $IP_{orth}$ of all impact points IP on plane P is a circle 500. The diameter of circle 500 defines $CA(S_k)$.

Detailed optical data and surface data are given in Tables 1-3 for the example of the lens elements in FIG. 2A. The values provided for these examples are purely illustrative, and according to other examples other values can be used.

Surface types are defined in Table 1. The coefficients for the surfaces are defined in Table 2. The surface types are:
a) Plano: flat surfaces, no curvature
b) Q type 1 (QT1) surface sag formula:

$$z(r) = \frac{cr^2}{1 + \sqrt{1-(1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, \quad x = u^2$$

$Q_0^{con}(x) = 1 \quad Q_1^{con} = -(5-6x) \quad Q_2^{con} = 15 - 14x(3-2x)$ $Q_3^{con} = -\{35 - 12x[14 - x(21-10x)]\}$ $Q_4^{con} = 70 - 3x\{168 - 5x[84 - 11x(8-3x)]\}$ $Q_5^{con} = -[126 - x(1260 - 11x\{420 - x[720 - 13x(45-14x)]\})]$ where $\{z, r\}$ are the standard cylindrical polar coordinates, c is the paraxial curvature of the surface, k is the conic parameter, $r_{norm}$ is generally one half of the surface's clear aperture, and $A_n$ are the polynomial coefficients shown in lens data tables. The Z axis is positive towards image. Values for CA are given as a clear aperture radius, i.e. CA/2. The reference wavelength is 555.0 nm. Units are in mm except for refraction index ("Index") and Abbe #. Each lens element $L_i$ has a respective focal length $f_i$, given in Table 1. The FOV is given as half FOV (HFOV). The definitions for surface types, Z axis, CA values, reference wavelength, units, focal length and HFOV are valid for Tables 1-17.

TABLE 1

Lens system 200
EFL = 15.0 mm, F number = 2.2, Half FOV = 13.25 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −0.795 | 3.408 | | | | |
| 2 | Lens 1 | ASP | 5.103 | 1.539 | 3.645 | Plastic | 1.54 | 55.91 | 35.74 |
| 3 | | | 6.170 | 1.607 | 3.606 | | | | |
| 4 | Lens 2 | ASP | 3.492 | 1.559 | 2.944 | Plastic | 1.54 | 55.91 | 17.63 |
| 5 | | | 4.611 | 0.620 | 2.792 | | | | |
| 6 | Lens 3 | ASP | −4.169 | 1.421 | 2.772 | Plastic | 1.67 | 19.44 | −14.69 |
| 7 | | | −8.176 | 0.493 | 2.475 | | | | |
| 8 | Lens 4 | ASP | 3.021 | 1.701 | 2.469 | Plastic | 1.54 | 55.91 | 20.11 |
| 9 | | | 3.337 | 3.954 | 2.438 | | | | |
| 10 | Lens 5 | ASP | −3.359 | 1.509 | 2.942 | Plastic | 1.67 | 19.44 | −39.43 |
| 11 | | | −4.540 | 0.040 | 3.543 | | | | |
| 12 | Lens 6 | ASP | 12.089 | 1.704 | 3.920 | Plastic | 1.54 | 55.91 | 12.05 |
| 13 | | | −13.762 | 1.368 | 3.896 | | | | |
| 14 | Filter | Plano | Infinity | 0.210 | — | Glass | 1.52 | 64.17 | |
| 15 | | | Infinity | 0.275 | — | | | | |
| 16 | Image | Plano | Infinity | — | — | | | | |

TABLE 2

Aspheric Coefficients

| Surface # | Conic | A4 | A6 | A8 | A10 |
|---|---|---|---|---|---|
| 2 | 0 | −2.64E−03 | −8.84E−07 | 2.34E−07 | −5.05E−07 |
| 3 | 0 | −9.49E−03 | 6.22E−04 | −3.76E−05 | 7.07E−07 |
| 4 | 0 | −1.37E−02 | −2.75E−04 | 9.19E−05 | −7.12E−06 |
| 5 | 0 | −1.48E−02 | 9.78E−04 | −8.57E−05 | 2.50E−06 |
| 6 | 0 | 2.37E−02 | −2.66E−03 | 2.23E−04 | −7.42E−06 |
| 7 | 0 | 1.36E−02 | −1.29E−03 | 8.14E−05 | 3.27E−06 |
| 8 | 0 | −1.13E−02 | −7.97E−04 | 4.89E−05 | −8.25E−06 |
| 9 | 0 | −8.28E−03 | 2.76E−05 | −1.17E−04 | 5.77E−06 |
| 10 | 0 | 1.01E−02 | −2.86E−04 | 5.62E−05 | −2.92E−06 |
| 11 | 0 | 4.11E−03 | −4.26E−04 | 6.78E−05 | −3.01E−06 |
| 12 | 0 | −2.04E−03 | −2.68E−04 | 3.25E−05 | −7.07E−07 |
| 13 | 0 | −1.26E−03 | −7.29E−05 | −2.48E−06 | 6.02E−07 |

Table 3 provides details on the variation of the properties of lens system 200 with the object-lens distance. The object-lens distance is defined by the distance of the object to the 1st principal plane of the lens.

Table 4 provides details on the maximum (image-side) CRAs of lens system 200. The maximum CRA and Half FOV (HFOV) are given for several object-lens distances ("Object"). Data refers to a field of 3.5 mm, corresponding to an edge of the image sensor (i.e. upper end of sensor diagonal).

For achieving small values of maximum CRA, the focal length $f_N$ of the last lens element $L_N$ is smaller than the lens' TTL. The TTL of lens 204 is 18 mm. For lens 204, $f_6$=12.05 mm and a ratio of $f_N$/TTL=0.67.

TABLE 3

Lens system 200
Variation of lens properties with object distance

| Object Distance [mm] | BFL [mm] | HFOV [deg] | Magnification |
|---|---|---|---|
| Infinity | 1.853 | 13.25 | 0.000 |
| 1000 | 2.076 | 13.17 | −0.015 |
| 500 | 2.299 | 13.08 | −0.030 |
| 300 | 2.599 | 12.98 | −0.050 |
| 250 | 2.750 | 12.92 | −0.060 |
| 200 | 2.977 | 12.83 | −0.076 |
| 150 | 3.357 | 12.67 | −0.101 |
| 100 | 4.125 | 12.34 | −0.153 |

TABLE 4

Max CRA/FOV-Lens system 200

| Object [mm] | Max CRA | HFOV (Image Height ("IH") = 3.5 mm) [deg] | Max CRA/FOV (IH = 3.5 mm) |
|---|---|---|---|
| Infinity | 4.96 | 13.29 | 0.19 |
| 1000 | 5.59 | 13.22 | 0.21 |
| 500 | 6.09 | 13.14 | 0.23 |
| 300 | 6.02 | 13.06 | 0.23 |
| 250 | 5.76 | 13.01 | 0.22 |
| 200 | 5.87 | 12.93 | 0.23 |
| 150 | 6.02 | 12.80 | 0.24 |
| 100 | 6.22 | 12.51 | 0.25 |

The focusing range of lens system 200 is from infinity to 100 mm. The focusing range of a lens system is defined as all object-lens distances that can be focused to by means of a camera mechanism that controls the distance between lens and image sensor. That is, for each object located within the focus range, a focusing mechanism can set a particular lens-image sensor distance that results in maximum contrast for the object's image. Maximum contrast means that for lens-image sensor distances other than the particular lens-image sensor distance, the object's contrast will decrease. The minimal object distance (MIOD) is defined as the lower limit of the focusing range, i.e. the MIOD is the smallest object-lens distance that the lens system can focus to. For lens system 200, the MIOD is 100 mm. Lens system 200 can focus continuously from infinity to 100 mm, i.e. any focus position between Infinity to 100 mm (as well as any magnification between 0 and −0.153) can be realized.

For focusing lens 204, all lens elements are moved together. For changing focus from infinity to 100 mm, a lens movement ("lens stroke") of 2.272 mm is required. For moving the lens, an actuator as known in the art may be used, e.g. a voice coil motor (VCM). A Hall sensor-magnet geometry for large stroke linear position sensing which is required for VCMs supporting large strokes such as 2 mm or more is described in the U.S. Provisional Patent Application No. 63/059,200. At the MIOD, lens system 200 achieves a magnification of −0.153, corresponding to an object-image ratio of ca. 6.5:1. The HFOV decreases from 13.25 degrees when focused to infinity to 12.34 degrees when focused to the MIOD.

For any object within the focus range, lens system 200 has a maximum field curvature (MFC) smaller than 50 μm. MFC may be defined as follows: when placing a lens such as lens 204 at a distance v from a flat image sensor such as image sensor 208, image points at the optical axis will be in perfect focus, but image points off the optical axis will come into focus not at the image sensor, but at a distance v' smaller than v, wherein v' is less than MFC for all image points.

A lens such as lens 204 can be divided into two lens groups, a first lens group ("focusing group" or "G1") and a second lens group ("CRA correction group" or "G2"). In lens 204, the focusing group includes lens elements $L_1$, $L_2$, $L_3$ and $L_4$. The CRA correction group includes $L_4$ and $L_5$. The focusing group and the CRA correction group are separated spatially from each other by a big gap (BG) of 3.954 mm. All lens elements of G1 together have an EFL1=14.71 mm. All lens elements of G2 together have an EFL2=13.55 mm.

Figure 2B:
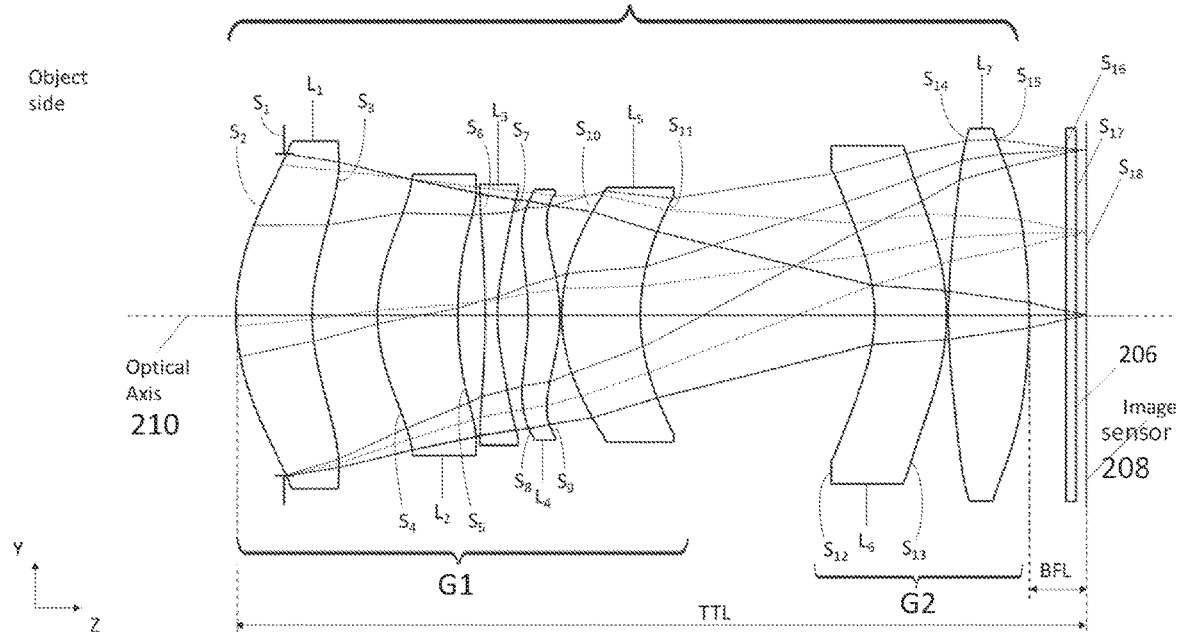
FIG. 2B shows schematically another optical lens system disclosed herein.
Figure 2C:
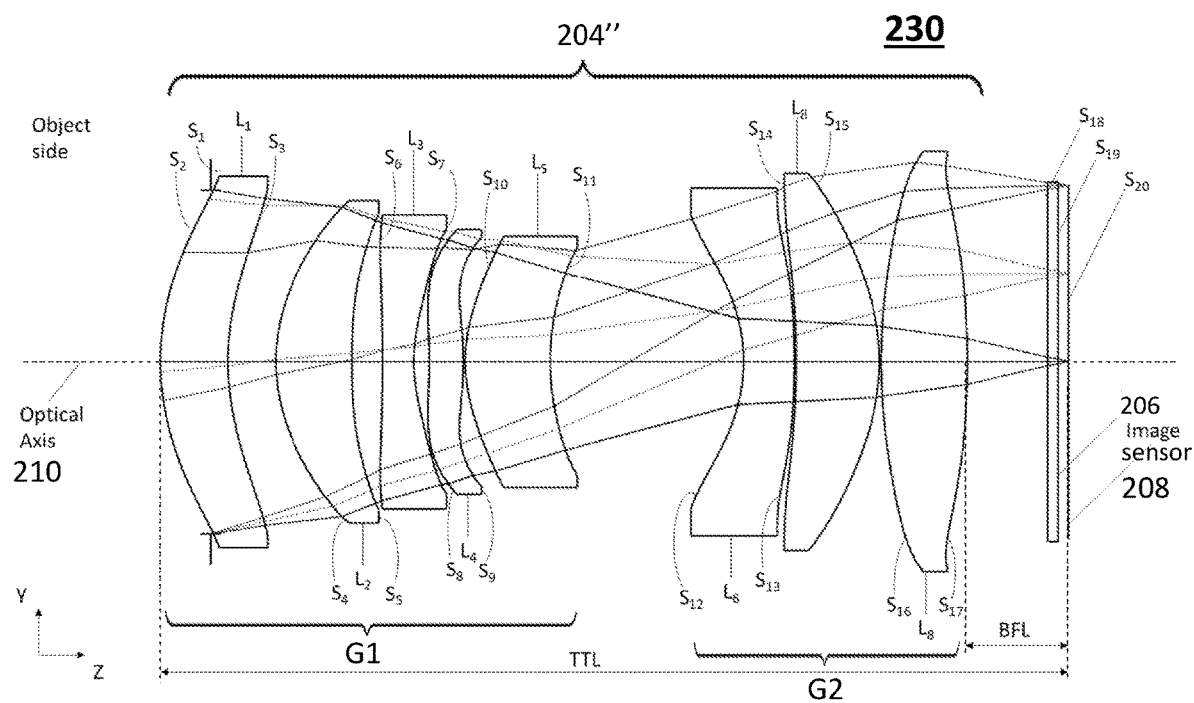
FIG. 2C shows schematically yet another optical lens system disclosed herein.
Figure 2D:
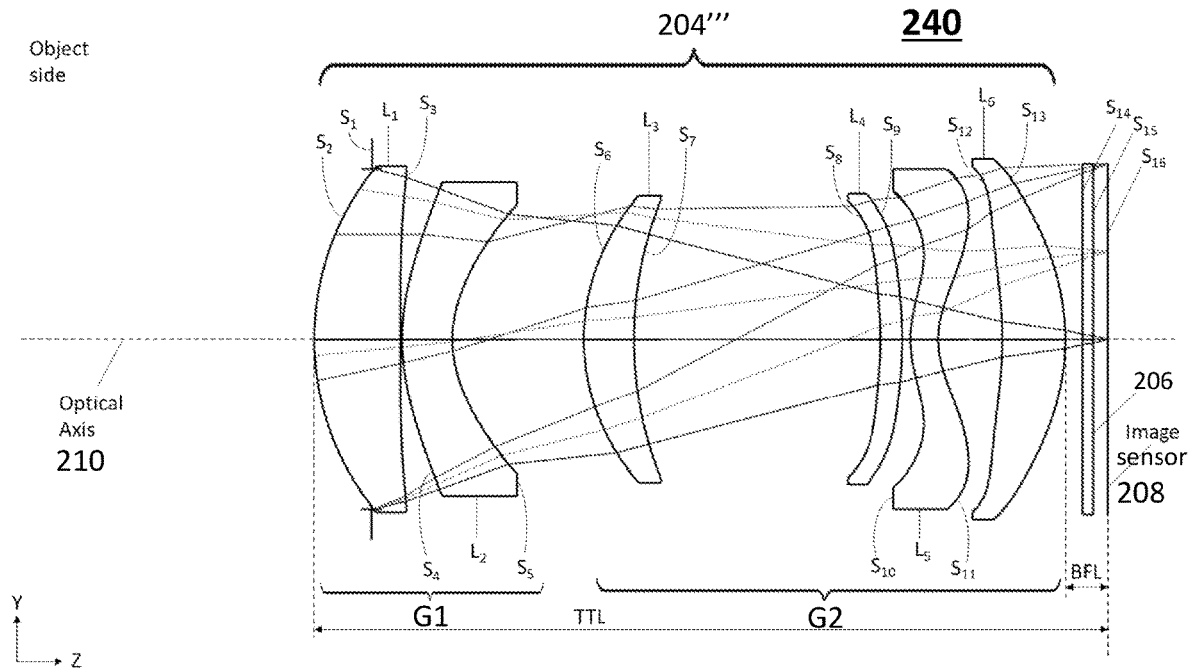
FIG. 2D shows schematically yet another optical lens system disclosed herein, focused to infinity.
Figure 2E:
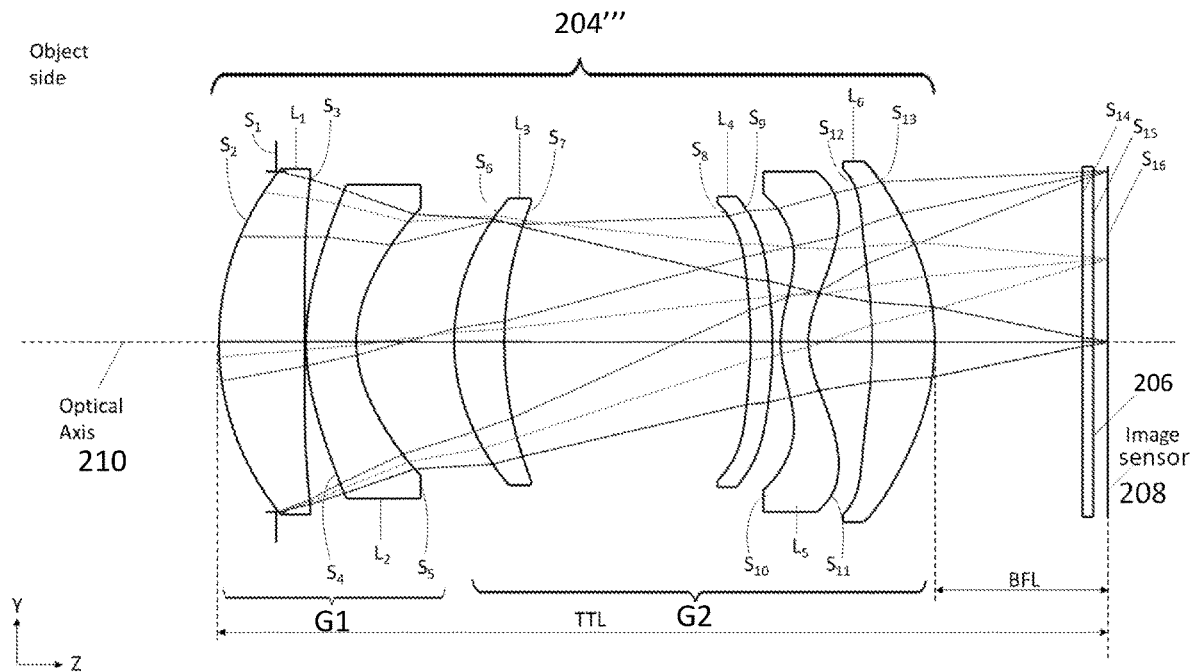
FIG. 2E shows the lens system of FIG. 2D focused to 100 mm.
Figure 2F:
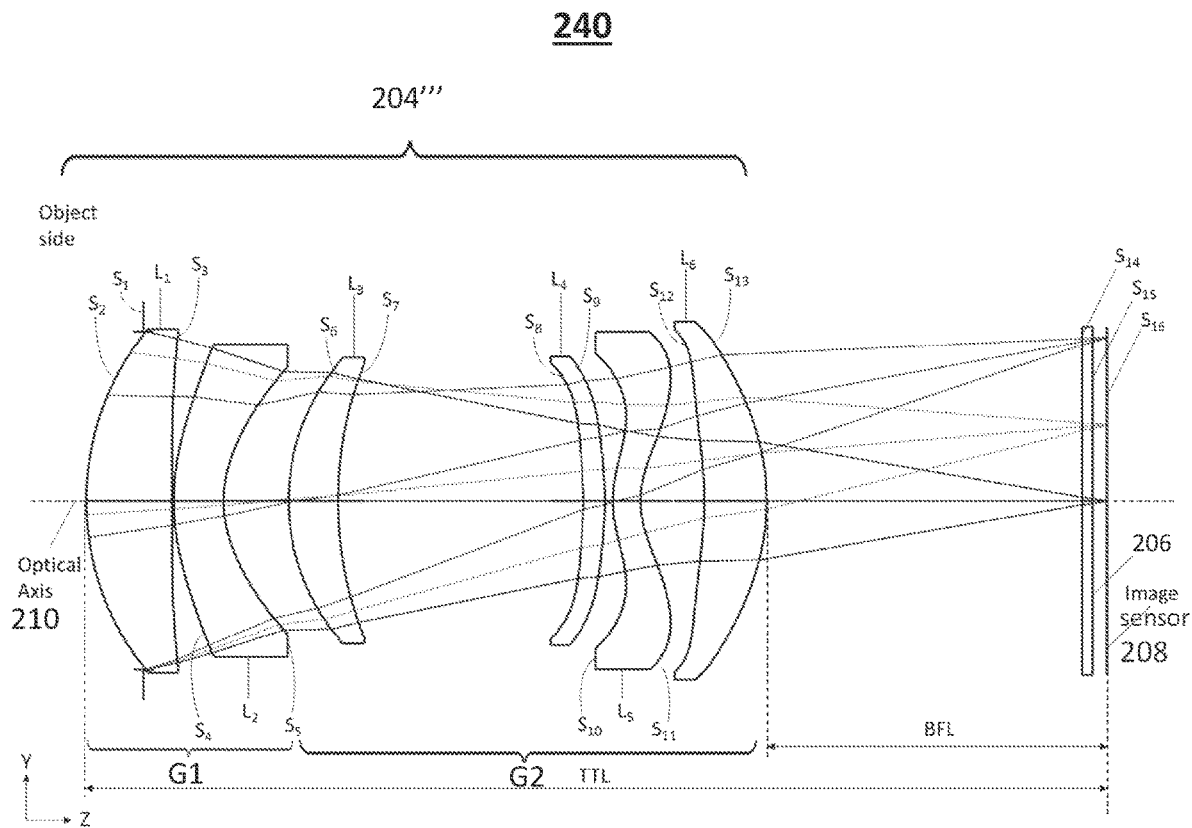
FIG. 2F shows the lens system of FIG. 2D focused to 50 mm.
Figure 2G:
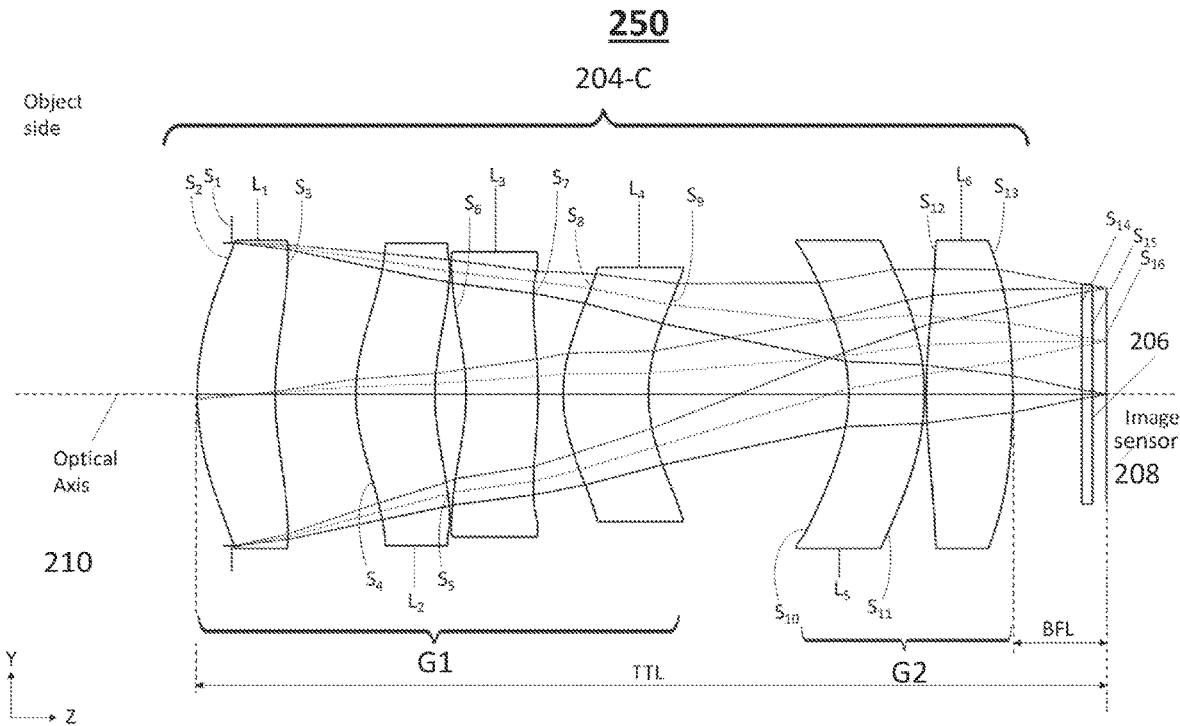
FIG. 2G shows schematically an optical lens system disclosed herein with lens elements cut to a non-circular shape.

In another lens system embodiment 250 shown in FIG. 2G and for achieving a folded lens system with low f/# and low lens height at the same time, lens elements are cut to a non-circular shape ("D-cut"). The cut lens elements may be obtained by cutting the large lens elements of lens 204 to a height of e.g. 6 mm (in Y direction), so that the lens is now a cut lens 204-C. That is, the lens elements $L_i$ of lens 204 that have height $H_{Li}$>6 mm (i.e. $L_1$, $L_5$ and $L_6$) are cut to 6 mm. Lens elements are cut in the Y-direction. The cut is performed symmetrically, i.e. the cut top part (defined by larger Y values in FIG. 2A) is identical in size to the cut bottom (defined by smaller Y values in FIG. 2A). The cut lens elements in 204-C have no circular symmetry like that of lens elements 204; their width is larger than their height, i.e. $W_{Li}$>$H_{Li}$ (see example in FIG. 7). Lens elements Li of lens 204 that have height $H_{Li}$≤6 mm are not changed. As to the cut, cut lens elements $L_1$, $L_5$ and $L_6$ have a large CA but still low CH. This is beneficial as in a folded lens design in which a lens height $H_L$ may determine the camera's height, wherein the camera height is limited in general by a height of the host device. A folded lens having large CA and low CH is beneficial for having a low f/# folded lens that is compatible with e.g. a smartphone's height constraints. The CA of lens elements $L_2$, $L_3$ and $L_4$ may be oriented in any direction, e.g. in Y direction. As of the cut design, the CA of lens element $L_1$, $L_5$ and $L_6$ is oriented in the X direction (not visible here).

Light is lost at extreme rays by cutting the lens elements, but no light loss is expected for center rays. Light loss is given as percentage of rays-through at the image plane at an image sensor boundary having coordinates (X, Y)=(0, 2.1 mm), i.e. moving up from the optical axis by 2.1 mm:

Infinity: 92.49%
1 m: 92.22%
0.5 m: 91.94%
20 cm: 91.01%
10 cm: 89.43%

In other embodiments, only one or only two lens elements $L_i$ may be cut, i.e. may have $W_{Li}$>$H_{Li}$. In yet other embodiments, more than three lens elements $L_i$ may be cut, i.e. may have $W_{Li}$>$H_{Li}$. In yet other embodiments, all lens elements $L_i$ may be cut, i.e. may have $W_{Li}$>$H_{Li}$. In yet other embodiments, a cut lens may be achieved by cutting the large lens elements of lens 204 to a height of e.g. 6.5 mm, 5 mm or 4 mm (in the Y direction), i.e. lens elements $L_i$ that have height $H_{Li}$>6.5 mm, 5 mm or 4.5 mm may be cut to 6.5 mm, 5 mm or 4.5 mm respectively.

Attention is now drawn to FIG. 2B, which depicts schematically another optical lens system disclosed herein and numbered 220. Lens system 220 comprises a lens 204' with a plurality of lens elements, optical element 206 (optional) and image sensor 208. Ray tracing is provided as in FIG. 2A. Detailed optical data and surface data are given in Tables 5, 6, 7 and 8. Table 8 provides details on the maximum CRAs of lens system 220. Notation and field are identical to Table 4.

FIG. 2B shows 3 fields with 3 rays for each: the upper marginal-ray, the lower marginal-ray and the chief-ray.

the large lens elements of lens 204' to a height of e.g. 6.5 mm, 5 mm or 4 mm (in the Y direction), i.e. the lens elements $L_i$ that have height $H_{Li}$>6.5 mm, 5 mm or 4.5 mm may be cut to 6.5 mm, 5 mm or 4.5 mm respectively. For details on cut lenses it is referred to the description of FIG. 2A.

TABLE 5

Lens system 220
EFL = 15.0 mm, F number = 2.2, Half FOV = 13.3 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.030 | 3.408 | | | | |
| 2 | Lens 1 | ASP | 4.603 | 1.619 | 3.633 | Plastic | 1.54 | 55.91 | 119.97 |
| 3 | | | 4.335 | 1.382 | 3.441 | | | | |
| 4 | Lens 2 | ASP | 3.577 | 1.700 | 2.930 | Plastic | 1.54 | 55.91 | 9.38 |
| 5 | | | 9.836 | 0.571 | 2.729 | | | | |
| 6 | Lens 3 | ASP | −25.617 | 0.260 | 2.710 | Plastic | 1.67 | 19.44 | −5.17 |
| 7 | | | 4.059 | 0.651 | 2.619 | | | | |
| 8 | Lens 4 | ASP | −5.649 | 0.671 | 2.605 | Plastic | 1.54 | 55.91 | 17.54 |
| 9 | | | −3.704 | 0.040 | 2.518 | | | | |
| 10 | Lens 5 | ASP | 3.303 | 1.675 | 2.649 | Plastic | 1.67 | 19.44 | 13.22 |
| 11 | | | 4.172 | 4.960 | 2.471 | | | | |
| 12 | Lens 6 | ASP | −3.581 | 1.519 | 3.048 | Plastic | 1.67 | 19.44 | −35.15 |
| 13 | | | −4.939 | 0.040 | 3.530 | | | | |
| 14 | Lens 7 | ASP | 12.341 | 1.703 | 3.857 | Plastic | 1.54 | 55.91 | 11.86 |
| 15 | | | −12.986 | 0.780 | 3.890 | | | | |
| 16 | Filter | Plano | Infinity | 0.210 | — | Glass | 1.52 | 64.17 | |
| 17 | | | Infinity | 0.220 | — | | | | |
| 18 | Image | Plano | Infinity | — | — | | | | |

The focusing range of lens system 220 is from infinity to 100 mm, i.e. the MIOD is 100 mm.

For focusing with lens 204', all lens elements are moved together. For changing focus from infinity to 100 mm, a lens stroke of 2.237 mm is required. For moving the lens, an actuator as known in the art may be used, e.g. a VCM. At the MIOD, lens system 210 achieves a magnification of −0.15, corresponding to an object-image ratio of ca. 6.7:1. The HFOV decreases from 13.29 degrees when focused to infinity to 12.51 degrees when focused to the MIOD. Any focus position between infinity to 100 mm (as well as any magnification between 0 and −0.15) can be realized. For any object within the focus range, lens system 220 has a maximum field curvature (MFC)<50 μm.

Lens 204' can be divided into two groups, a first focusing group which includes lens elements $L_1$, $L_2$, $L_3$, $L_4$ and $L_5$ and a second CRA correction group which includes $L_6$ and $L_7$. The focusing group and the CRA correction group are separated spatially from each other by a big gap of 4.960 mm. All lens elements of G1 together have an EFL1=14.08 mm, all lens elements of G2 together have an EFL2=13.94 mm. The TTL of lens 204' is 18 mm.

Figure 2H:
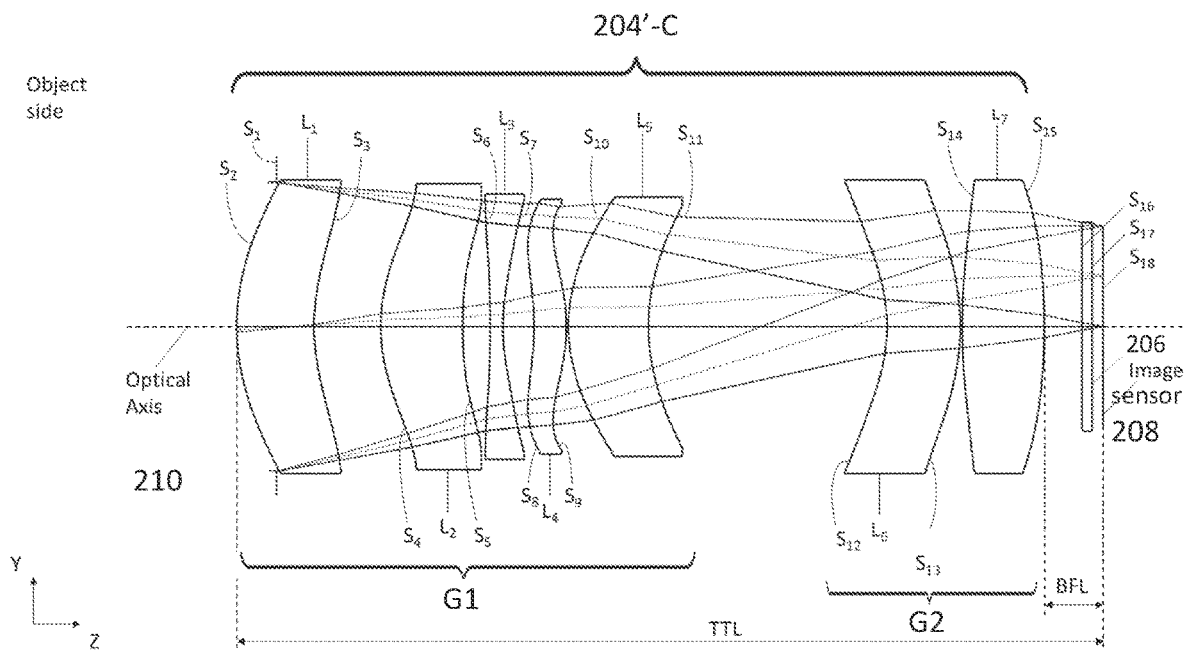
FIG. 2H shows schematically another optical lens system disclosed herein with lens elements cut to a non-circular shape.

FIG. 2H an embodiment numbered 260 of a lens system with a D-cut lens 204'-C based on lens 204'. As in the description of FIG. 2G, light loss is given as percentage of rays-through at coordinates (X, Y)=(0, 2.1 mm):

Infinity: 92.33%
1 m: 92.07%
0.5 m: 91.75%
20 cm: 90.76%
10 cm: 89.11%

D-cut lens 204'-C is obtained by cutting the large lens elements of lens 204' to a height of e.g. 6 mm (in the Y direction), i.e. the lens elements $L_i$ of lens 204' that have height $H_{Li}$>6 mm (i.e. $L_1$, $L_6$ and $L_7$) are cut to 6 mm. In other embodiments, a cut lens may be achieved by cutting

TABLE 6

Aspheric Coefficients

| Surface # | Conic | A4 | A6 | A8 | A10 |
|---|---|---|---|---|---|
| 2 | 0 | −2.62E−03 | 9.87E−06 | −3.09E−07 | −4.05E−07 |
| 3 | 0 | −9.81E−03 | 4.21E−04 | −2.87E−05 | 4.48E−07 |
| 4 | 0 | −7.71E−03 | −4.01E−05 | −4.65E−05 | 1.34E−06 |
| 5 | 0 | 9.24E−03 | −1.27E−03 | −1.66E−05 | 2.67E−06 |
| 6 | 0 | −1.68E−03 | 7.18E−05 | 1.10E−04 | −1.03E−05 |
| 7 | 0 | −2.43E−02 | 2.85E−03 | −8.38E−05 | −7.26E−06 |
| 8 | 0 | 1.45E−02 | 6.75E−04 | −3.20E−05 | −4.50E−06 |
| 9 | 0 | 1.54E−02 | 1.39E−03 | −1.53E−04 | 1.25E−05 |
| 10 | 0 | −6.69E−03 | −1.41E−04 | 2.93E−05 | −4.92E−06 |
| 11 | 0 | −6.80E−03 | 1.38E−03 | −1.76E−04 | 5.48E−06 |
| 12 | 0 | 7.57E−03 | 1.80E−04 | 4.85E−06 | −5.12E−07 |
| 13 | 0 | 2.74E−03 | −1.10E−05 | 2.79E−05 | −1.63E−06 |
| 14 | 0 | −1.70E−03 | −5.47E−05 | 1.09E−05 | −2.45E−06 |
| 15 | 0 | −2.92E−04 | −1.37E−04 | 5.95E−06 | 1.00E−07 |

TABLE 7

Lens system 220
Variation of lens properties with object distance

| Object Distance [mm] | BFL [mm] | HFOV [deg] | Magnification |
|---|---|---|---|
| Infinity | 1.210 | 13.29 | 0.00 |
| 1000 | 1.432 | 13.22 | −0.02 |
| 500 | 1.655 | 13.14 | −0.03 |
| 300 | 1.952 | 13.06 | −0.05 |
| 250 | 2.101 | 13.01 | −0.06 |
| 200 | 2.324 | 12.93 | −0.08 |
| 150 | 2.698 | 12.80 | −0.10 |
| 100 | 3.447 | 12.51 | −0.15 |

TABLE 8

CRA/FOV-Lens system 220

| Object [mm] | Max CRA | HFOV (Image Height ("IH") = 3.5 mm) [deg] | Max CRA/FOV (IH = 3.5 mm) |
|---|---|---|---|
| Infinity | 3.90 | 13.29 | 0.15 |
| 1000 | 4.54 | 13.22 | 0.17 |
| 500 | 5.07 | 13.14 | 0.19 |
| 300 | 4.65 | 13.06 | 0.18 |
| 250 | 4.74 | 13.01 | 0.18 |
| 200 | 4.87 | 12.93 | 0.19 |
| 150 | 5.04 | 12.80 | 0.20 |
| 100 | 5.28 | 12.51 | 0.21 |

FIG. 2C depicts schematically another optical lens system disclosed herein and numbered 230. Lens system 230 comprises a lens 204", optical element 206 (optional) and image sensor 208. Ray tracing is provided as in FIG. 2A-2B. Detailed optical data and surface data are given in Tables 9, 10, 11 and 12. Table 12 provides details on the maximum CRAs of lens system 220. Notation and field are identical to Table 4.

FIG. 2C shows 3 fields with 3 rays for each: the upper marginal-ray, the lower marginal-ray and the chief-ray. The focusing range of lens system 230 is from infinity to 76.4 mm, i.e. the MIOD is 76.4 mm. For focusing with lens 204", all lens elements are moved together. For changing focus from Infinity to 100 mm, a lens stroke of 2.881 mm is required. For moving the lens, an actuator (e.g. a VCM) as known in the art may be used. At the MIOD, lens system 230 achieves a magnification of −0.195, corresponding to an object-image ratio of ca. 5.1:1. The HFOV decreases from 13.29 degrees when focused to infinity to 12.52 degrees when focused to the MIOD. Any focus position between Infinity to 76.4 mm (as well as any magnification between 0 and −0.195) can be realized. For any object within the focus range, lens system 230 has a MFC<50 μm.

Lens 204" can be divided into two groups, a first focusing group that includes $L_1$, $L_2$, $L_3$, $L_4$ and $L_5$ and a second CRA correction group that includes $L_6$, $L_7$ and $L_8$. The focusing group and the CRA correction group are separated spatially from each other by a big gap of 3.839 mm. All lens elements of G1 together have an EFL1=13.50 mm, all lens elements of G2 together have an EFL2=11.85 mm. The TTL of lens 204" is 18 mm.

Figure 2I:
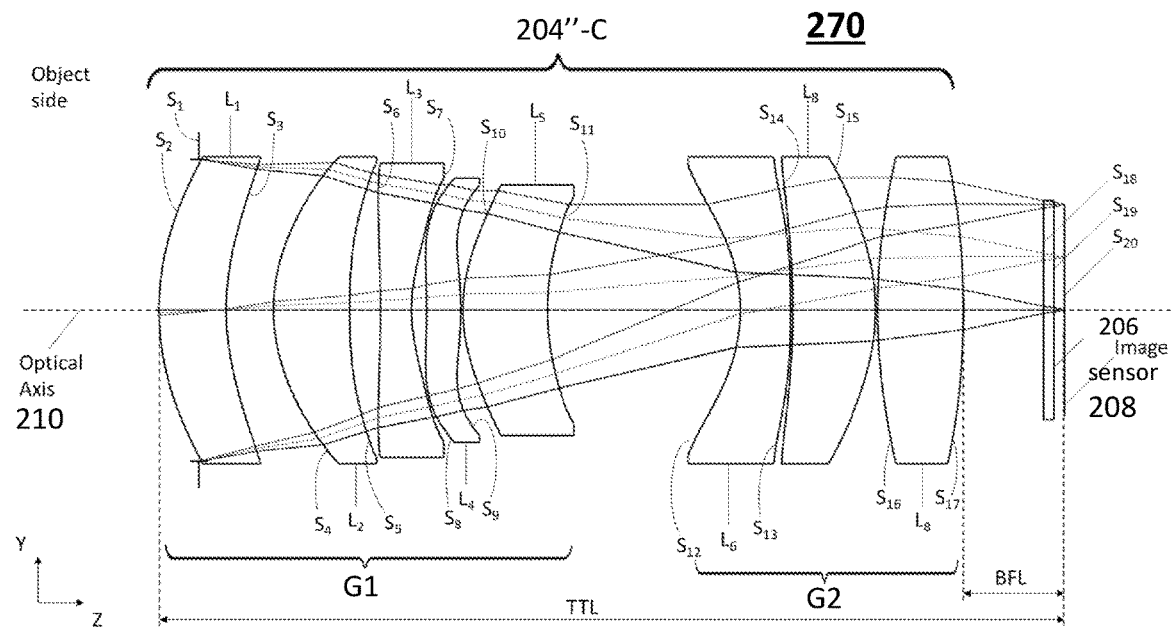
FIG. 2I shows schematically yet another optical lens system disclosed herein with lens elements cut to a non-circular shape.

FIG. 2I shows an embodiment numbered 270 of a lens system with a cut lens 204"-C based on lens 204". As in the description of FIG. 2G, light loss is given as percentage of rays-through at coordinates (X, Y)=(0, 2.1 mm):
Infinity: 93.21%
1 m: 92.99%
0.5 m: 92.74%
20 cm: 92.01%
7.64 cm: 85.82%

204"-C is obtained by cutting the large lens elements of lens 204" to a height of e.g. 6 mm (in Y direction). The lens elements $L_i$ of lens 204" that have height $H_{L_i}$>6 mm (i.e. $L_1$, $L_2$, $L_6$, $L_7$ and $L_8$) are cut to 6 mm. In other embodiments, a cut lens may be achieved by cutting the large lens elements of lens 204" to a height of e.g. 6.5 mm, 5 mm or 4 mm (in the Y direction). For details on cut lenses it is referred to the description of FIG. 2A.

TABLE 9

Lens system 230
EFL = 15.0 mm, F number = 2.2, HFOV = 13.29 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.160 | 3.409 | | | | |
| 2 | Lens 1 | ASP | 5.187 | 1.335 | 3.629 | Plastic | 1.54 | 56.02 | 138.46 |
| 3 | | | 5.064 | 0.950 | 3.445 | | | | |
| 4 | Lens 2 | ASP | 3.563 | 1.513 | 3.150 | Plastic | 1.54 | 55.91 | 8.07 |
| 5 | | | 15.708 | 0.609 | 2.903 | | | | |
| 6 | Lens 3 | ASP | −39.685 | 0.617 | 2.873 | Plastic | 1.65 | 21.78 | −4.50 |
| 7 | | | 3.201 | 0.303 | 2.583 | | | | |
| 8 | Lens 4 | ASP | −11.948 | 0.675 | 2.580 | Plastic | 1.53 | 55.97 | 22.38 |
| 9 | | | −6.098 | 0.040 | 2.440 | | | | |
| 10 | Lens 5 | ASP | 3.209 | 1.680 | 2.444 | Plastic | 1.67 | 19.44 | 10.03 |
| 11 | | | 4.813 | 3.839 | 2.212 | | | | |
| 12 | Lens 6 | ASP | −3.377 | 1.002 | 2.840 | Plastic | 1.65 | 21.78 | −6.59 |
| 13 | | | −17.249 | 0.040 | 3.403 | | | | |
| 14 | Lens 7 | ASP | −15.688 | 1.652 | 3.496 | Plastic | 1.58 | 30.11 | 9.50 |
| 15 | | | −4.267 | 0.040 | 3.690 | | | | |
| 16 | Lens 8 | ASP | 12.159 | 1.701 | 4.123 | Plastic | 1.54 | 56.02 | 13.86 |
| 17 | | | −18.946 | 1.592 | 4.063 | | | | |
| 18 | Filter | Plano | Infinity | 0.210 | — | Glass | 1.52 | 64.17 | |
| 19 | | | Infinity | 0.202 | — | | | | |
| 20 | Image | Plano | Infinity | 0.000 | — | | | | |

TABLE 10

Aspheric Coefficients

| Surface # | Conic | A4 | A6 | A8 | A10 |
|---|---|---|---|---|---|
| 2 | 0 | −1.26E−03 | 2.06E−05 | −1.02E−06 | −3.50E−07 |
| 3 | 0 | −5.16E−03 | 3.31E−04 | −2.35E−05 | 2.89E−07 |
| 4 | 0 | −4.34E−03 | 2.48E−04 | −4.84E−05 | 1.77E−06 |
| 5 | 0 | 8.67E−03 | −8.16E−04 | −1.20E−05 | 4.10E−06 |
| 6 | 0 | −3.47E−04 | 2.29E−05 | 5.60E−05 | −4.03E−06 |
| 7 | 0 | −3.01E−02 | 2.92E−03 | −7.26E−05 | −6.05E−06 |
| 8 | 0 | 1.89E−02 | 2.99E−04 | −6.15E−05 | −8.51E−07 |
| 9 | 0 | 2.09E−02 | 2.15E−03 | −3.43E−04 | 9.74E−06 |
| 10 | 0 | −1.05E−02 | −5.90E−04 | 1.64E−04 | −1.37E−05 |
| 11 | 0 | −5.32E−03 | 7.82E−04 | −2.81E−05 | 7.36E−06 |
| 12 | 0 | 9.47E−04 | 5.64E−04 | 6.09E−05 | −2.44E−06 |
| 13 | 0 | −3.85E−03 | 1.06E−04 | 4.63E−05 | −2.32E−06 |

TABLE 10-continued

Aspheric Coefficients

| Surface # | Conic | A4 | A6 | A8 | A10 |
|---|---|---|---|---|---|
| 14 | 0 | 3.81E−04 | −3.62E−05 | 1.72E−05 | −7.92E−07 |
| 15 | 0 | 3.94E−03 | 4.70E−05 | −9.66E−06 | 5.03E−07 |
| 16 | 0 | 5.83E−05 | −8.90E−05 | 5.22E−06 | 4.24E−08 |
| 17 | 0 | −1.59E−03 | 1.52E−04 | −1.02E−05 | 4.46E−07 |

TABLE 11

Lens system 230
Variation of lens properties with object distance

| Object Distance [mm] | BFL [mm] | HFOV [deg] | Magnification |
|---|---|---|---|
| Infinity | 2.004 | 13.29 | 0.000 |
| 1000 | 2.225 | 13.24 | −0.015 |
| 500 | 2.447 | 13.11 | −0.030 |
| 300 | 2.742 | 13.18 | −0.050 |
| 250 | 2.889 | 13.12 | −0.060 |
| 200 | 3.110 | 13.02 | −0.075 |
| 150 | 3.477 | 12.92 | −0.100 |
| 100 | 4.209 | 12.69 | −0.149 |
| 76.4 | 4.885 | 12.52 | −0.195 |

TABLE 12

CRA/FOV-Lens system 230

| Object [mm] | Max CRA | HFOV (Image height = 3.5 mm) | Max CRA/FOV (Image Height = 3.5 mm) |
|---|---|---|---|
| Infinity | 2.57 | 13.29 | 0.10 |
| 1000 | 3.21 | 13.24 | 0.12 |
| 500 | 3.72 | 13.11 | 0.14 |
| 300 | 3.35 | 13.18 | 0.13 |
| 250 | 3.45 | 13.12 | 0.13 |
| 200 | 3.59 | 13.02 | 0.14 |
| 150 | 3.78 | 12.92 | 0.15 |
| 100 | 4.06 | 12.69 | 0.16 |
| 76 | 3.99 | 12.52 | 0.16 |

Attention is now drawn to FIGS. 2D-2F, which depict schematically yet another optical lens system disclosed herein and numbered 240. Lens system 240 comprises a lens 204''', optical element 206 (optional) and image sensor 208. Ray tracing is provided as in FIG. 2A-2C. Detailed optical data and surface data are given in Tables 13, 14, 15, 16 and 17. Table 17 provides details on the Max CRAs of lens system 240. Notation and field are identical to Table 4. FIGS. 2D-2F show three fields with 3 rays for each: the upper marginal-ray, the lower marginal-ray and the chief-ray.

FIG. 2D shows lens system 240 focused to infinity ("Config. A"), FIG. 2E shows lens system 240 focused to 100 mm ("Config. B") and FIG. 2F shows lens system 240 focused to 50 mm ("Config. C"). The object-lens distance focused on is given by Surface 0 in Table 15. The focusing range of lens system 240 is from infinity to 50 mm, i.e. the MIOD is 50 mm.

Lens 204''' is divided into two groups that move relative to each other for focusing. A first lens group ("G1") includes lens elements $L_1$ and $L_2$, and a second lens group ("G2") includes $L_3$, $L_4$, $L_5$ and $L_6$. The big gap of between G1 and G2 decreases from 2.625 mm when focused to Infinity to 1.946 mm when focused to 100 mm, and to 1.303 mm when focused to 50 mm (see Surface #5 in table 15). For focusing, lens 204''' also moves as one unit so that the BFL changes (see Surface #13 in Table 15).

For moving the lens, an actuator (e.g. VCM) may be used, At the MIOD, lens system 240 achieves a magnification of −0.40, corresponding to an object-image ratio of ca. 2.5:1. The HFOV decreases from 13.1 degrees when focused to infinity to 9.3 degrees when focused to the MIOD (see Table 16). Any focus position between Infinity to 50 mm (as well as any magnification between 0 and −0.4) can be realized.

For any object within the focus range, lens system 240 has a MFC<50 μm. All lens elements of G1 together have an EFL1=38.61 mm, all lens elements of G2 together have an EFL2=15.36 mm. The TTL of lens 204''' is 15.8 mm.

Figure 2J:
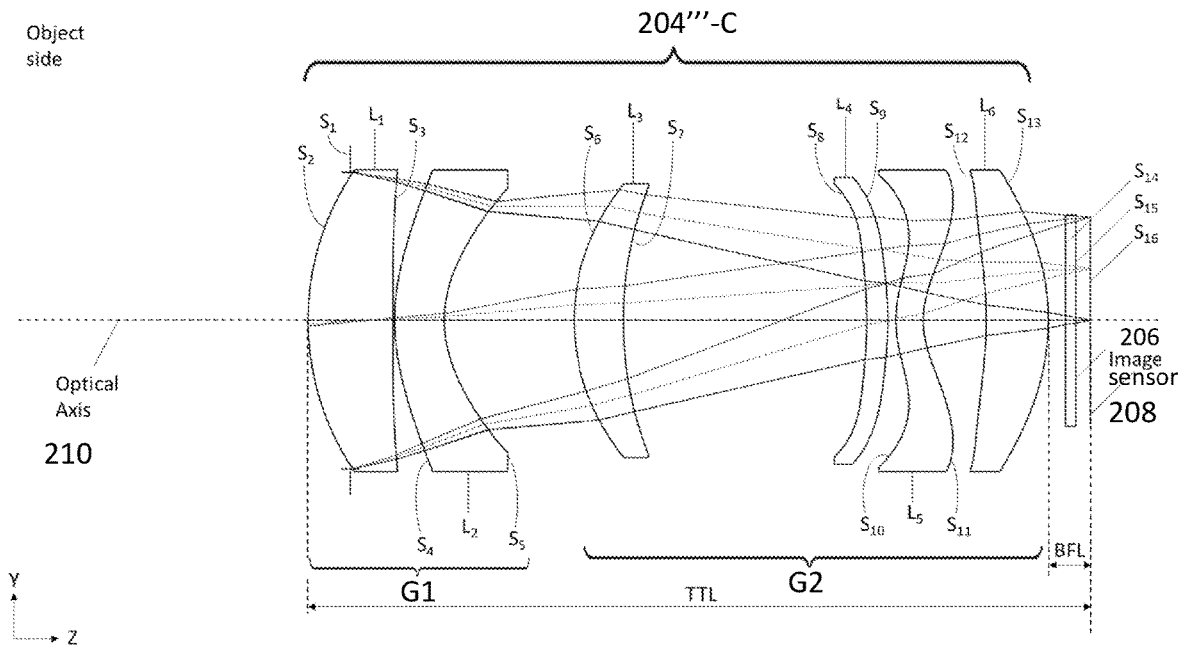
FIG. 2J shows schematically yet another optical lens system disclosed herein with lens elements cut to a non-circular shape.

FIG. 2J shows an embodiment numbered 280 of a lens system with a cut lens 204'''-C based on lens 204'''. As in the description of FIG. 2G, light loss is given as percentage of rays-through at coordinates (X, Y)=(0, 2.1 mm):

Infinity: 94.58%
10 cm: 91.53%
5 cm: 91.02%

Cut lens 204'''-C is obtained by cutting the large lens elements of lens 204''' to a height of 6 mm (in Y direction), i.e. the lens elements $L_i$ of lens 204''' that have height $H_{Li}$>6 mm ($L_1$, $L_2$, $L_5$ and $L_6$) are cut to 6 mm. In other embodiments, a cut lens may be achieved by cutting the large lens elements of lens 204''' to a height of e.g. 6.5 mm, 5 mm or 4 mm (in the Y direction).

TABLE 13

Lens system 240
EFL = 15.0 mm, F number = 2.2, HFOV = 13.1 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.138 | 3.394 | | | | |
| 2 | Lens 1 | ASP | 5.548 | 1.713 | 3.399 | Plastic | 1.53 | 55.66 | 10.11 |
| 3 | | | −225.776 | 0.031 | 3.268 | | | | |
| 4 | Lens 2 | ASP | 4.454 | 1.000 | 3.084 | Plastic | 1.64 | 23.52 | −9.96 |
| 5 | | | | 2.401 | 2.625 | 2.627 | | | |
| 6 | Lens 3 | ASP | 4.197 | 1.000 | 2.722 | Plastic | 1.53 | 55.66 | 15.25 |
| 7 | | | 7.888 | 4.910 | 2.661 | | | | |
| 8 | Lens 4 | ASP | −6.881 | 0.435 | 2.717 | Plastic | 1.66 | 20.37 | 1841.21 |
| 9 | | | −7.016 | 0.162 | 2.848 | | | | |
| 10 | Lens 5 | ASP | 2.335 | 0.551 | 2.906 | Plastic | 1.53 | 55.66 | −24.20 |
| 11 | | | 1.816 | 1.274 | 3.339 | | | | |
| 12 | Lens 6 | ASP | −7.488 | 1.251 | 3.393 | Plastic | 1.53 | 55.66 | 20.05 |

TABLE 13-continued

Lens system 240
EFL = 15.0 mm, F number = 2.2, HFOV = 13.1 deg.

| Surface # | Comment | Type | Curvature Radius | Thickness | Aperture Radius (D/2) | Material | Index | Abbe # | Focal Length |
|---|---|---|---|---|---|---|---|---|---|
| 13 | | | −4.675 | 0.344 | 3.546 | | | | |
| 14 | Filter | Plano | Infinity | 0.210 | — | Glass | 1.52 | 64.17 | |
| 15 | | | Infinity | 0.290 | — | | | | |
| 16 | Image | Plano | Infinity | — | — | | | | |

For details on cut lenses it is referred to the description of FIG. 2A.

TABLE 14

Aspheric Coefficients

| Surface # | Conic | A4 | A6 | A8 | A10 |
|---|---|---|---|---|---|
| 2 | −4.21E−01 | 6.50E−04 | −1.01E−05 | 1.56E−06 | −5.69E−08 |
| 3 | −2.24E+02 | 2.36E−03 | −1.58E−04 | 5.38E−06 | −7.57E−08 |
| 4 | −4.52E+00 | −5.19E−04 | 5.31E−05 | −6.85E−06 | 3.53E−07 |
| 5 | −2.24E+00 | 2.21E−03 | 1.61E−05 | −1.54E−06 | 7.95E−07 |
| 6 | −8.98E−03 | −7.71E−05 | −5.52E−05 | 5.85E−06 | −8.17E−07 |
| 7 | 6.54E−01 | 6.97E−04 | −2.34E−05 | −6.13E−07 | −5.58E−07 |
| 8 | −6.59E+01 | 4.55E−03 | −1.90E−03 | 2.62E−05 | 3.32E−06 |
| 9 | −4.32E−01 | 1.47E−02 | −3.66E−03 | 2.57E−04 | −5.76E−06 |
| 10 | −4.54E+00 | −2.21E−02 | −1.28E−03 | 3.91E−04 | −2.22E−05 |
| 11 | −1.73E+00 | −3.64E−02 | 4.33E−03 | −2.94E−04 | 6.72E−06 |
| 12 | −2.40E+01 | 1.32E−03 | 3.07E−04 | −3.67E−05 | −4.21E−07 |
| 13 | −1.13E+00 | 6.63E−04 | −3.99E−04 | 6.48E−05 | −3.13E−06 |

TABLE 15

Lens system 240
Variation of surface thicknesses

| Surface # | Config. A | Config. B | Config. C |
|---|---|---|---|
| 0 | 1.00E+06 | 100 | 50 |
| 5 | 2.625 | 1.946 | 1.303 |
| 13 | 0.344 | 2.941 | 6.318 |

TABLE 16

Lens system 240

| Config. # | HFOV | Magnification |
|---|---|---|
| A | 13.1 deg | 0 |
| B | 11.3 deg | −0.17 |
| C | 9.3 deg | −0.40 |

TABLE 17

CRA/FOV-Lens system 240

| Object [mm] | Max CRA | HFOV (Image Height ("IH") = 3.5 mm) [deg] | Max CRA/FOV (IH = 3.5 mm) |
|---|---|---|---|
| Infinity | 12.65 | 13.09 | 0.48 |
| 1000 | 12.51 | 11.64 | 0.54 |
| 50 | 11.44 | 9.92 | 0.58 |

TABLE 18

EFL ratios between groups G1 and G2

| Embodiment | Last surface of first group | EFL1 (EFL of G1) | EFL2 (EFL of G2) | Ratio EFL1/EFL2 |
|---|---|---|---|---|
| 200 | 9 | 14.71 | 13.55 | 1.09 |
| 220 | 11 | 14.08 | 13.94 | 1.01 |
| 230 | 11 | 13.50 | 11.85 | 1.14 |
| 240 | 5 | 38.61 | 15.36 | 2.51 |
| 290 | 11 | 14.1 | 12.3 | 1.15 |

Table 18 shows an overview on the EFLs of all lens elements of the G1 and G2 respectively as well as ratios EFL1/EFL2 for lens system embodiments 200, 220, 230, 240 and 290.

Figure 2K:
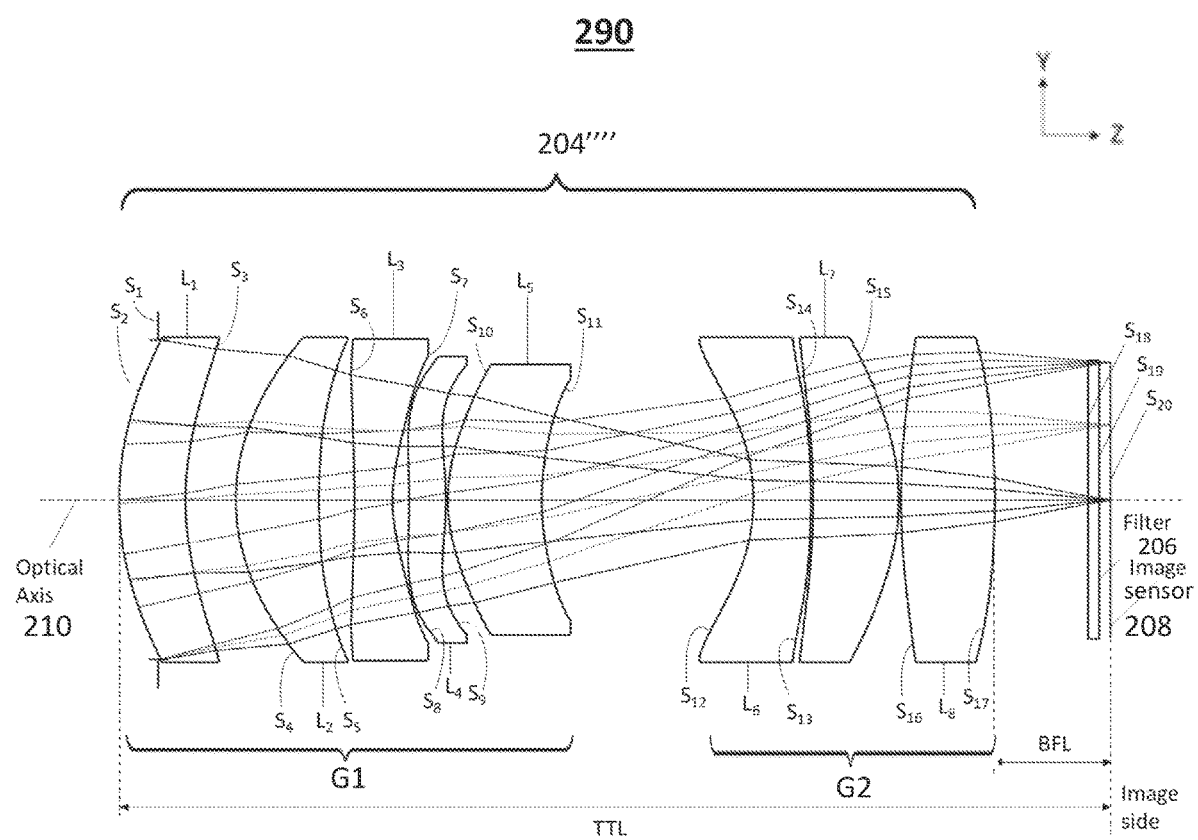
FIG. 2K shows schematically yet another optical lens system disclosed herein, focused to infinity.

FIG. 2K depicts schematically another optical lens system disclosed herein and numbered 290. Lens system 290 comprises a lens 204"" with a plurality of lens elements, optical element 206 (optional) and image sensor 208. Ray tracing is provided as in FIG. 2A. Detailed optical data, surface data and further lens properties are given in Tables 19, 20, 21 and 22.

The focusing range of lens system 290 is from infinity to 52 mm (MIOD=52 mm).

For focusing with lens 204"", all lens elements are moved together. For changing focus from infinity to 52 mm, a lens stroke of 4.507 mm is required. At the MIOD, lens system 290 achieves a magnification of −0.29, corresponding to an object-image ratio of ca. 3.4:1. The HFOV decreases from 9.57 degrees when focused to infinity to 8.52 degrees when focused to the MIOD. Any focus position between infinity to 52 mm (as well as any magnification between 0 and −0.29) can be realized. For any object within the focus range, lens system 290 has a MFC<50 µm.

Lens 204"" can be divided into two groups, a first focusing group that includes $L_1$, $L_2$, $L_3$, $L_4$ and $L_5$ and a second CRA correction group that includes $L_6$, $L_7$ and $L_8$. The focusing group and the CRA correction group are separated spatially from each other by a big gap of 3.974 mm. All lens elements of G1 together have an EFL1=14.1 mm, all lens elements of G2 together have an EFL2=12.3 mm. The TTL of lens 204"" is 18.6 mm.

Some embodiments may include a cut lens based on lens 204"". The cut lens may be achieved by cutting the large lens elements of lens 204"" to a height of e.g. 6.5 mm, 5 mm or 4 mm (in the Y direction). For details on cut lenses, it is referred to the description of FIG. 2A.

TABLE 19

Embodiment 290
F = 15.5mm, F number = 2.58, HFOV = 13.29 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | | Infinity | −0.732 | 3.000 | | | | |
| 2 | Lens 1 | ASP | 5.487 | 1.243 | 3.000 | Plastic | 1.54 | 56.02 | 178.01 |
| 3 | | | 5.351 | 0.942 | 3.000 | | | | |
| 4 | Lens 2 | ASP | 3.687 | 1.573 | 3.000 | Plastic | 1.54 | 55.91 | 8.24 |
| 5 | | | 17.247 | 0.659 | 3.000 | | | | |
| 6 | Lens 3 | ASP | −34.749 | 0.716 | 2.969 | Plastic | 1.65 | 21.78 | −4.57 |
| 7 | | | 3.302 | 0.310 | 2.644 | | | | |
| 8 | Lens 4 | ASP | −13.318 | 0.684 | 2.641 | Plastic | 1.53 | 55.97 | 24.85 |
| 9 | | | −6.772 | 0.041 | 2.494 | | | | |
| 10 | Lens 5 | ASP | 3.284 | 1.758 | 2.490 | Plastic | 1.67 | 19.44 | 9.94 |
| 11 | | | 5.040 | 3.974 | 2.228 | | | | |
| 12 | Lens 6 | ASP | −3.602 | 1.073 | 2.897 | Plastic | 1.65 | 21.78 | −7.06 |
| 13 | | | −18.159 | 0.044 | 3.000 | | | | |
| 14 | Lens 7 | ASP | −14.373 | 1.615 | 3.000 | Plastic | 1.58 | 30.11 | 10.02 |
| 15 | | | −4.342 | 0.041 | 3.000 | | | | |
| 16 | Lens 8 | ASP | 14.157 | 1.757 | 3.000 | Plastic | 1.54 | 56.02 | 14.47 |
| 17 | | | −17.049 | 1.743 | 3.000 | | | | |
| 18 | Filter | Plano | Infinity | 0.210 | — | Glass | 1.52 | 64.17 | |
| 19 | | | Infinity | 0.212 | — | | | | |
| 20 | Image | Plano | Infinity | — | — | | | | |

TABLE 20

| Aspheric Coefficients | | | | | | |
|---|---|---|---|---|---|---|
| Surface # | Conic | A4 | A6 | A8 | A10 | A12 |
| 2 | 0 | −1.21E−03 | −6.93E−05 | 3.32E−05 | −6.30E−06 | 5.62E−07 |
| 3 | 0 | −5.07E−03 | 3.57E−04 | −1.87E−05 | −2.46E−06 | 4.29E−07 |
| 4 | 0 | −4.06E−03 | 5.18E−04 | −1.20E−04 | 1.22E−05 | −8.59E−07 |
| 5 | 0 | 7.39E−03 | −8.92E−05 | −2.83E−04 | 6.07E−05 | −6.11E−06 |
| 6 | 0 | −4.46E−04 | 3.79E−04 | −1.33E−04 | 3.83E−05 | −5.13E−06 |
| 7 | 0 | −2.57E−02 | 1.10E−06 | 1.63E−03 | −5.53E−04 | 9.45E−05 |
| 8 | 0 | 1.88E−02 | −2.83E−03 | 1.86E−03 | −5.87E−04 | 9.51E−05 |
| 9 | 0 | 1.91E−02 | 2.54E−03 | −8.30E−04 | 2.32E−04 | −5.19E−05 |
| 10 | 0 | −9.94E−03 | 4.29E−04 | −4.14E−04 | 1.81E−04 | −3.75E−05 |
| 11 | 0 | −4.66E−03 | 1.18E−03 | −3.00E−04 | 1.12E−04 | −2.25E−05 |
| 12 | 0 | 7.88E−04 | −4.64E−04 | 4.63E−04 | −8.04E−05 | 7.21E−06 |
| 13 | 0 | −2.84E−03 | −9.77E−04 | 3.76E−04 | −4.70E−05 | 2.74E−06 |
| 14 | 0 | 1.30E−03 | −9.09E−04 | 2.99E−04 | −4.17E−05 | 2.82E−06 |
| 15 | 0 | 4.93E−03 | −8.53E−04 | 2.09E−04 | −2.46E−05 | 1.42E−06 |
| 16 | 0 | 1.54E−03 | −1.01E−03 | 1.89E−04 | −1.87E−05 | 1.06E−06 |
| 17 | 0 | −6.52E−04 | −1.55E−04 | 1.55E−05 | 5.19E−07 | −1.41E−07 |

| Surface # | Conic | A14 | A16 |
|---|---|---|---|
| 2 | 0 | −2.71E−08 | 5.34E−10 |
| 3 | 0 | −2.83E−08 | 6.99E−10 |
| 4 | 0 | 4.33E−08 | −1.18E−09 |
| 5 | 0 | 3.31E−07 | −7.68E−09 |
| 6 | 0 | 3.20E−07 | −7.80E−09 |
| 7 | 0 | −8.39E−06 | 3.03E−07 |
| 8 | 0 | −7.83E−06 | 2.58E−07 |
| 9 | 0 | 6.16E−06 | −2.88E−07 |
| 10 | 0 | 3.69E−06 | −1.41E−07 |
| 11 | 0 | 2.26E−06 | −6.86E−08 |
| 12 | 0 | −3.08E−07 | 4.71E−09 |
| 13 | 0 | −6.12E−08 | −6.65E−11 |
| 14 | 0 | −8.10E−08 | 4.86E−10 |
| 15 | 0 | −3.30E−08 | 9.41E−11 |
| 16 | 0 | −3.20E−08 | 3.98E−10 |
| 17 | 0 | 7.77E−09 | −1.35E−10 |

TABLE 21

Embodiment 290
Variation of lens properties with object distance

| Object Distance [mm] | BFL [mm] | HFOV [deg] | Magnification |
|---|---|---|---|
| Infinity | 2.166 | 9.57 | 0.00 |
| 1033 | 2.395 | 9.56 | −0.01 |
| 517 | 2.625 | 9.59 | −0.03 |
| 310 | 2.931 | 9.60 | −0.05 |
| 258 | 3.083 | 9.46 | −0.06 |
| 207 | 3.312 | 9.42 | −0.07 |
| 155 | 3.693 | 9.34 | −0.10 |
| 103 | 4.453 | 9.15 | −0.15 |
| 52 | 6.673 | 8.52 | −0.29 |

TABLE 22

CRA/FOV-Embodiment 290

| Object [mm] | Max. CRA [deg] | HFOV (Image Height ("IH") = 2.8 mm) [deg] | Max. CRA/FOV (IH = 2.8 mm) |
|---|---|---|---|
| Infinity | 0.65 | 9.57 | 0.03 |
| 1033 | 0.96 | 9.56 | 0.05 |
| 517 | 0.47 | 9.59 | 0.02 |
| 310 | 0.47 | 9.60 | 0.02 |
| 258 | 1.82 | 9.46 | 0.10 |
| 207 | 2.05 | 9.42 | 0.11 |
| 155 | 2.37 | 9.34 | 0.13 |
| 103 | 2.86 | 9.15 | 0.16 |
| 52 | 3.74 | 8.52 | 0.22 |

Figure 7:
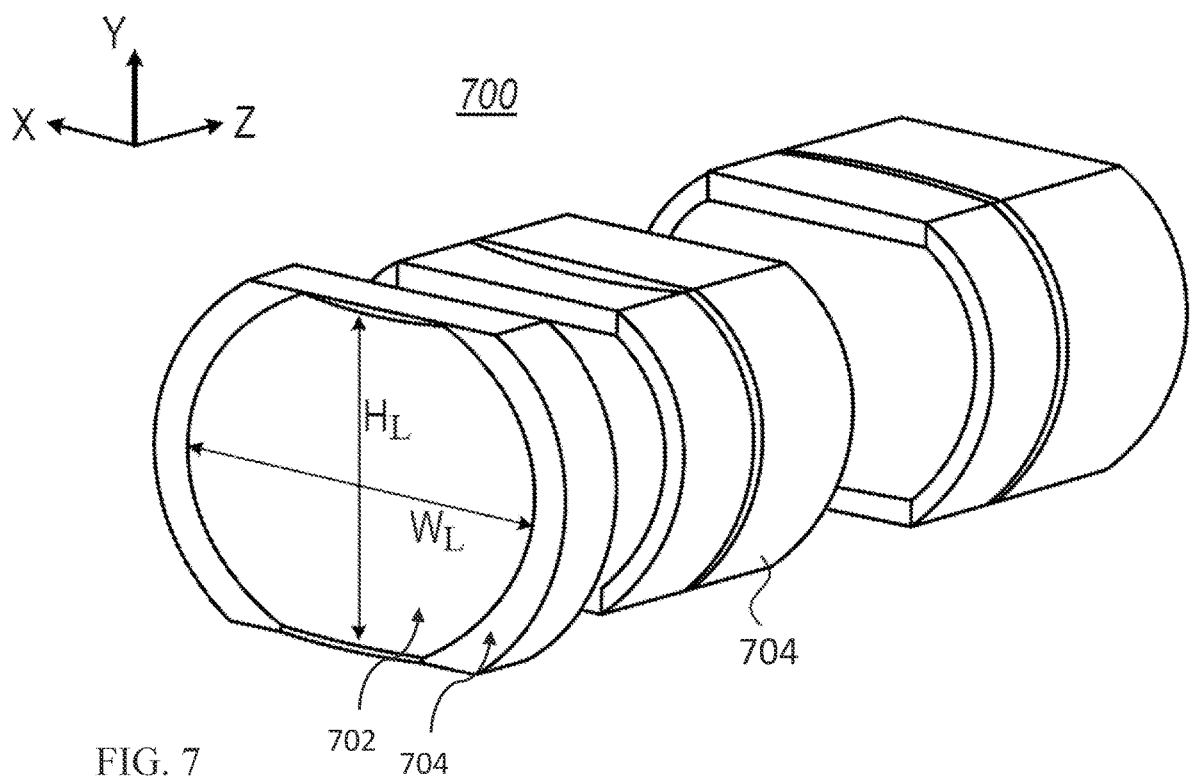
FIG. 7 shows an exploded view of lens elements illustrating lens element width $W_L$ and height $H_L$.

According to some examples, at least part of the lens elements can have a shape (profile) in cross-section (in plane X-Y, which is orthogonal to the optical lens system and which generally coincides with the optical axis) that is not circular. In particular, as shown for example in FIG. 7 for a lens barrel 700 carrying lens elements 702, at least some of the lens elements can have a width $W_{Li}$ (measured along axis X) which is greater than their height $H_{Li}$ (measured along axis Y). Barrel 700 further comprises a barrel wall (or surrounding) 704. The height $H_{Li}$ can correspond to the total height of the lens element (including the mechanical part). In some embodiments, a lens element in lens barrel 700 may have a symmetry about axis Y and/or about axis X. A non-circular lens barrel such as 700 maybe shaped according to the cut lens elements of a lens such as e.g. lens 204-C. As shown in FIG. 7, the height of a lens barrel may be only slightly higher than the lens element having the largest height in the lens. For example, a lens barrel may be 0-0.5 mm higher than the highest lens element. A lens barrel having an identical height as the highest lens element is described for example in co-owned international patent application PCT/IB2018/050988, which is incorporated herein by reference in its entirety.

According to some examples, $W_{Li}$ is substantially greater than $H_{Li}$ (for example, by at least a percentage which is equal or greater than 20%, these values being not limiting). In some examples, $W_{Li}$ may be greater than $H_{Li}$ by a percentage of 20-70%. Consider lens element $L_8$ of folded lens 204' as an example: $W_{L8}$ is greater than $H_{L8}$ by a percentage of 32%.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

What is claimed is:

1. A folded digital camera, comprising:
   a) a lens system with a lens and an image sensor, the lens having 6≤N≤8 lens elements Li, an effective focal length (EFL) and a total track length (TTL), wherein each lens element has a respective focal length fi and wherein a first lens element L1 faces an object side; and
   b) an optical path folding element (OPFE) for providing a folded optical path between an object and the lens, wherein the lens system has a focusing range that covers object-lens distances from infinity to a minimal object distance (MIOD) for macro photography of between 5-15 cm, wherein MIOD/EFL<20, and wherein an object-to-image magnification M is between 1:1-15:1.

2. The folded digital camera of claim 1, wherein MIOD/EFL<15.

3. The folded digital camera of claim 1, wherein MIOD/EFL<13.

4. The folded digital camera of claim 1, wherein MIOD/EFL<10.

5. The folded digital camera of claim 1, wherein MIOD/EFL<7.

6. The folded digital camera of claim 1, wherein a maximum field curvature MFC for any object within the focus range is smaller than 50 μm.

7. The folded digital camera of claim 1, wherein the camera has a f number<4.

8. The folded digital camera of claim 1, wherein the camera has a f number<3.

9. The folded digital camera of claim 1, wherein the camera has a f number<2.5.

10. The folded digital camera of claim 1, wherein the lens elements are divided into two lens element groups separated by a big gap greater than TTL/8.

11. The folded digital camera of claim 1, wherein the lens elements are divided into two lens element groups separated by a big gap greater than TTL/7.

12. The folded digital camera of claim 1, wherein the lens elements are divided into two lens element groups separated by a big gap greater than TTL/6.

13. The folded digital camera of claim 1, wherein the lens elements are divided into a first lens element group with an effective focal length EFL1 and a second lens element group with an effective focal length EFL2 and wherein a ratio EFL1/EFL2 does not deviate from 1 by more than 10%.

14. The folded digital camera of claim 1, wherein the lens elements are divided into a first lens element group with an effective focal length EFL1 and a second lens element group with an effective focal length EFL2 and wherein a ratio EFL1/EFL2 does not deviate from 1 by more than 20%.

15. The folded digital camera of claim 1, further comprising a voice coil motor based focusing mechanism for focusing the camera.

16. The folded digital camera of claim 1, wherein the first lens element L1, and a second lens element L2 are made of a material with an Abbe number greater than 50.

17. The folded digital camera of claim 1, wherein TTL/EFL<1.5.

18. The folded digital camera of claim 1, wherein TTL/EFL<1.4.

19. The folded digital camera of claim 1, wherein TTL/EFL<1.3.

20. The folded digital camera of claim 1, wherein a ratio of the focal length $f_N$ of the last lens element $L_N$ and the TTL fulfills $f_N/TTL<1.0$.

21. The folded digital camera of claim 1, wherein a ratio of the focal length $f_N$ of the last lens element $L_N$ and the TTL fulfills $f_N/TTL<0.9$.

22. The folded digital camera of claim 1, wherein a ratio of the focal length $f_N$ of the last lens element $L_N$ and the TTL fulfills $f_N/TTL<0.8$.

23. The folded digital camera of claim 1, wherein a ratio of the focal length $f_N$ of the last lens element $L_N$ and the TTL fulfills $f_N/TTL<0.75$.

24. The folded digital camera of claim 1, wherein a ratio of the focal length $f_N$ of the last lens element $L_N$ and the TTL fulfills $f_N/TTL<0.7$.

25. The folded digital camera of claim 1, additionally including an optical element, wherein the optical element is located between the lens and the image sensor.

* * * * *